US012040173B2

(12) United States Patent
Langridge et al.

(10) Patent No.: US 12,040,173 B2
(45) Date of Patent: *Jul. 16, 2024

(54) QUADRUPOLE DEVICES

(71) Applicant: Micromass UK Limited, Wilmslow (GB)

(72) Inventors: David J. Langridge, Bollington (GB); Martin Raymond Green, Bowdon (GB)

(73) Assignee: Micromass UK Limited, Wilmslow (GB)

(*) Notice: Subject to any disclaimer, the term of this patent is extended or adjusted under 35 U.S.C. 154(b) by 371 days.

This patent is subject to a terminal disclaimer.

(21) Appl. No.: 17/437,717

(22) PCT Filed: Mar. 11, 2020

(86) PCT No.: PCT/GB2020/050591

§ 371 (c)(1),
(2) Date: Sep. 9, 2021

(87) PCT Pub. No.: WO2020/183159

PCT Pub. Date: Sep. 17, 2020

(65) Prior Publication Data

US 2022/0148874 A1 May 12, 2022

(30) Foreign Application Priority Data

Mar. 11, 2019 (GB) ..................................... 1903213
Mar. 11, 2019 (GB) ..................................... 1903214

(51) Int. Cl.
*H01J 49/42* (2006.01)
*H01J 49/00* (2006.01)

(52) U.S. Cl.
CPC ...... *H01J 49/4215* (2013.01); *H01J 49/0031* (2013.01); *H01J 49/429* (2013.01)

(58) Field of Classification Search
CPC ... H01J 49/4215; H01J 49/0031; H01J 49/429
(Continued)

(56) References Cited

U.S. PATENT DOCUMENTS 5,227,629 A 7/1993 Miseki
5,561,291 A 10/1996 Kelley et al.
(Continued)

FOREIGN PATENT DOCUMENTS

CA 2656197 A1 1/2008
CN 101223625 A 7/2008
(Continued)

OTHER PUBLICATIONS

Search Report under Section 17(5) for United Kingdom Patent Application No. GB 1802589.0, mailed on Aug. 2, 2018, 4 pages.
(Continued)

*Primary Examiner* — Nicole M Ippolito
(74) *Attorney, Agent, or Firm* — Goodwin Procter LLP

(57) ABSTRACT

A method of operating a quadrupole device (10) is disclosed. The quadrupole device (10) is operated in a mode of operation by applying a repeating voltage waveform comprising a main drive voltage and at least one auxiliary drive voltage is applied to the quadrupole device to the quadrupole device (10). The intensity of ions passing into the quadrupole device is varied with time in synchronisation with the repeating voltage waveform. This may be done such that the number of ions per unit phase which initially experience a phase within a first range of phases of the repeating voltage waveform is greater than the number of ions per unit phase which initially experience a phase within a second range of phases of the repeating voltage waveform.

20 Claims, 7 Drawing Sheets

(58) Field of Classification Search
USPC .......................................... 250/281, 282, 283
See application file for complete search history.

(56) References Cited

U.S. PATENT DOCUMENTS

| | | | |
|---|---|---|---|
| 5,747,801 A | 5/1998 | Quarmby et al. | |
| 6,140,641 A | 10/2000 | Yoshinari | |
| 7,034,292 B1 | 4/2006 | Whitehouse et al. | |
| 10,991,567 B2 * | 4/2021 | Langridge ........... | H01J 49/0031 |
| 11,201,048 B2 | 12/2021 | Langridge et al. | |
| 2002/0074492 A1 | 6/2002 | Taniguchi | |
| 2004/0232328 A1 | 11/2004 | Ding et al. | |
| 2007/0295900 A1 | 12/2007 | Konenkov et al. | |
| 2009/0194688 A1 | 8/2009 | Bateman et al. | |
| 2010/0084547 A1 | 4/2010 | Pringle et al. | |
| 2010/0116982 A1 | 5/2010 | Wamoto et al. | |
| 2012/0049059 A1 | 3/2012 | Taniguchi | |
| 2015/0097113 A1 | 4/2015 | Campbell et al. | |
| 2017/0032954 A1 | 2/2017 | Giles et al. | |
| 2018/0047549 A1 | 2/2018 | Quass et al. | |
| 2021/0082679 A1 | 3/2021 | Green et al. | |

FOREIGN PATENT DOCUMENTS

| | | | |
|---|---|---|---|
| CN | 101536137 | A | 9/2009 |
| CN | 104517798 | A | 4/2015 |
| CN | 105957797 | A | 9/2016 |
| CN | 106463334 | A | 2/2017 |
| CN | 109643634 | A | 4/2019 |
| DE | 10336500 | A1 | 4/2004 |
| GB | 2278232 | A | 11/1994 |
| GB | 2301705 | A | 12/1996 |
| GB | 2421842 | A | 7/2006 |
| JP | S6188445 | A | 5/1986 |
| JP | 2017084450 | A | 5/2017 |
| WO | 199428575 | A1 | 12/1994 |
| WO | 2003021631 | A2 | 3/2003 |
| WO | 2017206965 | A1 | 12/2017 |
| WO | 2018020600 | A1 | 2/2018 |
| WO | 2018046905 | A1 | 3/2018 |
| WO | 2018046906 | A1 | 3/2018 |
| WO | 2020183159 | A1 | 9/2020 |
| WO | 2020183160 | A1 | 9/2020 |

OTHER PUBLICATIONS

Sudakov et al., "Possibility of Operating Quadrupole Mass Filter at High Resolution", International Journal of Mass Spectrometry, vol. 408, pp. 9-19, Sep. 2016.

Sudakov, M.Y., and Mamontov, E.V., "The Use of Stability Bands to Improve the Performance of Quadrupole Mass Filters", Technical Physics, vol. 62(1):107-115, (2017).

International Search Report and Written Opinion of International Patent Application No. PCT/GB2019/050404, mailed on May 3, 2019, 15 pages.

Combined Search and Examination Report under Sections 17 and 18(3) for United Kingdom Patent Application No. GB1902127.8, mailed on Aug. 8, 2019, 6 pages.

Konenkov et al., "Quadrupole Mass Filter Acceptance in Stability Island Created by Double-Frequency Quadrupole Excitation", European Journal of Mass Spectrometry, vol. 24, pp. 315-321, Feb. 2018.

Search Report under Section 17(5) for United Kingdom Patent Application No. GB1802601.3, mailed on Aug. 2, 2018, 3 pages.

International Search Report and Written Opinion for International Patent Application No. PCT/GB2019/050405, mailed on May 8, 2019, 13 pages.

Combined Search and Examination Report under Sections 17 and 18(3) for United Kingdom Patent Application No. GB1902115.3, mailed on Aug. 6, 2019, 6 pages.

Gershman, D. J., et al. "Higher order parametric excitation modes for spaceborne quadrupole mass spectrometers." Review of scientific instruments 82.12 (2011 ): 125109 (Year: 2011).

Konenkov, N.V., et al., "Quadrupole mass filter operation with auxiliary quadrupolar excitation: theory and experiment", International Journal of Mass Spectrometry 208:17-27 (2001).

Quadrupole Mass Spectrometry and Its Applications by P. Dawson (American Inst. of Physics, 1997) Abstract.

Combined Search and Examination Report under Sections 17 and 18(3), for Application No. GB2003532.5, dated Sep. 7, 2020, 6 pages.

International Search Report and Written Opinion for International application No. PCT/GB2020/050592, mailed on Jun. 16, 2020, 16 pages.

Douglas, D.J., and Konenkov, NV., "Quadrupole mass filter operation with dipole direct current and quadrupole radiofrequency excitation", Rapid Communications in Mass Spectrometry 32:1971-1977 (2018).

Combined Search and Examination Report under Sections 17 and 18(3), Application No. GB2003530.9 dated Sep. 7, 2020, 7 pages.

Examination Report under Section 18(3) for Application No. GB2003530.9, dated Jul. 30, 2021, 5 pages.

* cited by examiner

QUADRUPOLE DEVICES

CROSS-REFERENCE TO RELATED APPLICATIONS

This application is a U.S. national phase filing claiming the benefit of and priority to International Patent Application No. PCT/GB2020/050591, filed Mar. 11, 2020, which claims priority from and the benefit of United Kingdom patent application No. 1903213.5 filed on Mar. 11, 2019 and United Kingdom patent application No. 1903214.3 filed on Mar. 11, 2019. The entire contents of these applications are incorporated herein by reference.

FIELD OF THE INVENTION

The present invention relates generally to quadrupole devices and analytical instruments such as mass and/or ion mobility spectrometers that comprise quadrupole devices, and in particular to quadrupole mass filters and analytical instruments that comprise quadrupole mass filters.

BACKGROUND

Quadrupole mass filters are well known and comprise four parallel rod electrodes. FIG. 1 shows a typical arrangement of a quadrupole mass filter.

In conventional operation, an RF voltage and a DC voltage are applied to the rod electrodes of the quadrupole so that the quadrupole operates in a mass or mass to charge ratio resolving mode of operation. Ions having mass to charge ratios within a desired mass to charge ratio range will be onwardly transmitted by the mass filter, but undesired ions having mass to charge ratio values outside of the mass to charge ratio range will be substantially attenuated.

The drive voltages are selected such that the quadrupole device is operated in one of one or more so-called "stability regions", that is, such that at least some ions will assume a stable trajectory in the quadrupole device. For example, it is common for quadrupole devices to be operated in the so-called "first" (that is, lowest order) stability region.

The article M. Sudakov et al., International Journal of Mass Spectrometry 408 (2016) 9-19 (Sudakov), describes a mode of operation in which two additional AC excitations of a particular form are applied to the rod electrodes of the quadrupole (in addition to the main RF and DC voltages). This has the effect of creating a narrow and long band of stability along the high q boundary near the top of the first stability region (the "X-band"). Operation in the X-band mode can offer high mass resolution and fast mass separation.

It is desired to provide an improved quadrupole device.

SUMMARY

According to an aspect, there is provided a method of operating a quadrupole device, the method comprising:

operating the quadrupole device in a mode of operation in which a repeating voltage waveform comprising a main drive voltage and at least one auxiliary drive voltage is applied to the quadrupole device;

passing ions into the quadrupole device; and varying the intensity of the ions passing into the quadrupole device in synchronisation with the repeating voltage waveform.

Various embodiments are directed to a method of operating a quadrupole device, such as a quadrupole mass filter, in a mode of operation in which a (quadrupolar) repeating voltage waveform comprising a (quadrupolar) main drive voltage and at least one (quadrupolar) auxiliary drive voltage is applied to the quadrupole device, such as in an X-band or Y-band (or X-band-like or Y-band-like) mode of operation. The intensity of the ions passing into the quadrupole device is varied with time in synchronisation with the repeating voltage waveform. This may be done such that the number of ions per unit phase which initially experience a phase within a first range of phases of the repeating voltage waveform is greater than the number of ions per unit phase which initially experience a phase within a second range of phases of the repeating voltage waveform.

This means, for example, that the proportion (amount) of ions which initially experience the first range of phases of the repeating voltage waveform in the quadrupole device is increased relative to the case where the ion intensity is not varied with time (is constant).

Thus, in various embodiments, the intensity of ions passing into the quadrupole device is varied in time such that more of the ions passing into the quadrupole device initially experience the first range of phases of the repeating voltage waveform than initially experience the second range of phases. This may be such that more of the ions passing into the quadrupole device initially experience the first range of phases of the repeating voltage waveform than initially experience any other (non-overlapping) range of phases of the repeating voltage waveform.

Thus, for example, in various embodiments substantially all of a population of ions passed into a quadrupole device operating in a mode of operation in which a main drive voltage and at least one auxiliary drive voltage is applied to the quadrupole device (such as an X-band, X-band-like, Y-band or Y-band-like mode of operation) initially experiences the first range of phases of the repeating voltage waveform (and substantially no ions initially experience other phases of the repeating voltage waveform).

As will be described in more detail below, by varying the intensity of ions passing into a quadrupole device in this manner, the transmission of the ions through the quadrupole device can be improved, for example as compared to the transmission of ions through the quadrupole device without such intensity variation.

It will be appreciated, therefore, that the present invention provides an improved quadrupole device.

Varying the intensity of the ions passing into the quadrupole device may comprise varying the intensity of ions such that the number of ions per unit phase which initially experience a phase within a first range of phases of the repeating voltage waveform is greater than the number of ions per unit phase which initially experience a phase within a second range of phases of the repeating voltage waveform According to an aspect, there is provided a method of operating a quadrupole device, the method comprising:

operating the quadrupole device in a mode of operation in which a repeating voltage waveform comprising a main drive voltage and at least one auxiliary drive voltage is applied to the quadrupole device;

passing ions into the quadrupole device; and varying the intensity of the ions passing into the quadrupole device such that the number of ions per unit phase which initially experience a phase within a first range of phases of the repeating voltage waveform is greater than the number of ions per unit phase which initially experience a phase within a second range of phases of the repeating voltage waveform.

Operating the quadrupole device in the mode of operation in which the repeating voltage waveform comprising the main drive voltage and the at least one auxiliary drive voltage is applied to the quadrupole device may comprise operating the quadrupole device in an X-band mode of operation, a Y-band mode of operation, an X-band-like mode of operation or a Y-band-like mode of operation. That is, operating the quadrupole device in the mode of operation in which the repeating voltage waveform comprising the main drive voltage and the at least one auxiliary drive voltage is applied to the quadrupole device may comprise operating the quadrupole device in a stability region for which instability (ejection) at stability boundaries of the stability region may be in (only) a single (x- or y-) direction.

Varying the intensity of the ions passing into the quadrupole device may comprise varying (modulating, pulsing) the intensity of the ions passing into the quadrupole device with a frequency that is related to the frequency of the repeating voltage waveform.

Varying the intensity of the ions passing into the quadrupole device may comprise varying (modulating, pulsing) the intensity of the ions passing into the quadrupole device on the timescale of the repeating voltage waveform (or longer) (as opposed to on the (shorter) timescale of the main drive voltage).

The intensity variation (modulation, pulsing) may be synchronised (coherent) with the repeating voltage waveform.

The repeating voltage waveform may repeat with a first period Θ.

Varying the intensity of the ions passing into the quadrupole device may comprise varying (modulating, pulsing) the intensity of the ions passing into the quadrupole device substantially periodically with a second period that is approximately equal to nΘ, where n is a positive integer (for example, n=1, 2, 3, etc.).

The repeating voltage waveform may repeat with a first period Θ.

The main drive voltage may repeat with a third period T.

The first period Θ may be greater than the third period T.

The period of the repeating voltage waveform may be longer than the period of the main drive voltage, Θ>T. For example, at least 2, 3, 4, 5, 6, 7, 8, 9, 10 or 20 times longer.

Varying the intensity of the ions passing into the quadrupole device may comprise varying (modulating, pulsing) the intensity of the ions passing into the quadrupole device substantially periodically with a period that is longer than the period of the main drive voltage, T. For example, at least 2, 3, 4, 5, 6, 7, 8, 9, 10 or 20 times longer.

The first range of phases may be selected such that the maximum amplitude of oscillation of ions which initially experience a phase within the first range of phases is less than the maximum amplitude of oscillation of ions which initially experience a phase within the second range of phases.

The first range of phases may be selected so as to reduce or minimise the maximum amplitude of oscillation of ions which initially experience the first range of phases relative to the second ranges of phases, such as relative to other (non-overlapping) ranges of phases of the repeating voltage waveform.

The first range of phases may be selected such that the maximum amplitude of ion oscillation is less for the first range of phases than for the second range of phases, such as for other (non-overlapping) range of phases of the repeating voltage waveform.

The first range of phases may be selected such that the transmission of ions which initially experience a phase within the first range of phases is greater than the transmission of ions which initially experience a phase within the second range of phases.

The first range of phases may be selected so as to increase or maximise the transmission of ions which initially experience the first range of phases through the quadrupole device relative to the second range of phases, such as relative to other (non-overlapping) ranges of phases of the repeating voltage waveform.

The first range of phases may be selected such that the transmission of ions through the quadrupole device is greater for the first range of phases than for the second range of phases, such as for other (non-overlapping) range of phases of the repeating voltage waveform.

The second range of phases of the repeating voltage waveform may comprise all (non-overlapping) phases of the repeating voltage waveform other than the first range of phases of the repeating voltage waveform.

The first range of phases may be centred on (or close to) an Amplitude Phase Characteristic ("APC") minimum.

The Amplitude Phase Characteristic ("APC") may comprise one or more first periodic waveforms modulated by a second periodic waveform. The second periodic waveform may have a period equal to the period of the repeating voltage waveform, Θ.

The first range of phases may be centred on (or close to) a minimum in the second periodic waveform (modulation). The minimum in the second periodic waveform (modulation) may be (the first range of phases may be centred on (or close to)) Θ/2.

The first range of phases should span a fraction (only some but not all) of a (single) cycle of the repeating voltage waveform (of the period of the repeating voltage waveform, Θ). The fraction may be selected from the group consisting of: (i) $<1/20$; (ii) $1/20$ to $1/10$; (iii) $1/10$ to $1/5$; (iv) $1/5$ to $1/4$; (v) $1/4$ to $1/3$; (vi) $1/3$ to $1/2$; (vii) $>1/2$. The fraction may be greater than or equal to T/Θ, where T is the period of the main drive voltage and Θ is the period of the repeating voltage waveform.

Varying the intensity of the ions may comprise varying the intensity of the ions such that a maximum in the intensity of the ions coincides with the first range of phases. The maximum in the intensity of the ions may approximately coincide with the centre of first range of phases.

Passing ions into the quadrupole device may comprise passing a continuous beam of ions into the quadrupole device.

Alternatively, passing ions into the quadrupole device may comprise passing one or more packets of ions into the quadrupole device.

Varying the intensity of the ions passing into the quadrupole device may comprise continually varying (modulating) the intensity of the ions passing into the quadrupole device. In this case, not all of the ions may initially experience the selected range of phases. That is, some of the ions may initially experience other phases of the repeating voltage waveform.

Varying the intensity of the ions passing into the quadrupole device may comprise pulsing the ions into the quadrupole device such that substantially all of the ions initially experience a phase within the first range of phases of the repeating voltage waveform (and substantially none of the ions initially experience other phases of the repeating voltage waveform in the quadrupole device).

Varying the intensity of the ions passing into the quadrupole device may comprise at least one of:

(i) trapping ions in an ion trap or ion guide upstream of the quadrupole device, and varying the intensity of ions that are released from the ion trap or ion guide;

(ii) releasing ions having a selected mass to charge ratio or within a selected mass to charge ratio range from an ion trap or ion guide arranged upstream of the quadrupole device;

(iii) attenuating at least some ions upstream of the quadrupole device, and varying the degree to which ions are attenuated;

(iv) varying a DC voltage applied to the quadrupole device;

(v) forming packets of ions upstream of the quadrupole device, and passing the packets of ions into the quadrupole device; and (vi) generating packets of ions using a pulsed ion source, and passing the packets of ions into the quadrupole device.

The quadrupole device may comprise a quadrupole mass filter.

The method may comprise operating the quadrupole mass filter in the mode of operation such that ions are selected and/or filtered according to their mass to charge ratio.

The method may further comprise applying one or more DC voltages to the quadrupole device.

The method may comprise altering the resolution of the quadrupole device.

The method may comprise:

increasing the resolution of the quadrupole device while increasing the mass to charge ratio or mass to charge ratio range at which ions are selected and/or transmitted by the quadrupole device; or decreasing the resolution of the quadrupole device while decreasing the mass to charge ratio or mass to charge ratio range at which ions are selected and/or transmitted by the quadrupole device.

According to an aspect there is provided a method of mass and/or ion mobility spectrometry, comprising the method described above.

According to an aspect there is provided apparatus comprising:

a quadrupole device;

one or more voltage sources configured to apply a repeating voltage waveform comprising a main drive voltage and at least one auxiliary drive voltage to the quadrupole device; and one or more devices configured to cause the intensity of ions passing into the quadrupole device to vary in synchronisation with the repeating voltage waveform.

The one or more devices may be configured to cause the intensity of ions passing into the quadrupole device to vary such that the number of ions per unit phase which initially experience a phase within a first range of phases of the repeating voltage waveform is greater than the number of ions per unit phase which initially experience a phase within a second range of phases of the repeating voltage waveform.

According to an aspect there is provided apparatus comprising:

a quadrupole device;

one or more voltage sources configured to apply a repeating voltage waveform comprising a main drive voltage and at least one auxiliary drive voltage to the quadrupole device; and one or more devices configured to cause the intensity of ions passing into the quadrupole device to vary such that the number of ions per unit phase which initially experience a phase within a first range of phases of the repeating voltage waveform is greater than the number of ions per unit phase which initially experience a phase within a second range of phases of the repeating voltage waveform.

The one or more voltage sources may be configured to apply the repeating voltage waveform to the quadrupole device such that the quadrupole device is operated in an X-band mode of operation, a Y-band mode of operation, an X-band-like mode of operation or a Y-band-like mode of operation. That is, the one or more voltage sources may be configured to apply the repeating voltage waveform to the quadrupole device such that the quadrupole device is operated in a stability region for which instability (ejection) at stability boundaries of the stability region may be in (only) a single (x- or y-) direction.

The one or more devices may be configured to cause the intensity of ions passing into the quadrupole device to vary with a frequency that is related to the frequency of the repeating voltage waveform.

The repeating voltage waveform may repeat with a first period $\Theta$.

The one or more devices may be configured to cause the intensity of ions passing into the quadrupole device to vary substantially periodically with a second period that is approximately equal to $n\Theta$, where n is a positive integer.

The repeating voltage waveform may repeat with a first period G.

The main drive voltage may repeat with a third period T.

The first period $\Theta$ may be greater than the third period T.

The first range of phases may be selected such that the maximum amplitude of oscillation of ions which initially experience a phase within the first range of phases is less than the maximum amplitude of oscillation of ions which initially experience a phase within the second range of phases.

The first range of phases may be selected such that the transmission of ions which initially experience a phase within the first range of phases is greater than the transmission of ions which initially experience a phase within the second range of phases.

The one or more devices may be configured to cause the intensity of ions passing into the quadrupole device to vary such that a maximum in the intensity of the ions coincides with the first range of phases.

The one or more devices may be configured to cause the intensity of ions passing into the quadrupole device to vary by continually varying the intensity of the ions passing into the quadrupole device.

The one or more devices may be configured to cause the intensity of ions passing into the quadrupole device to vary by pulsing the ions into the quadrupole device such that substantially all of the ions initially experience a phase within the first range of phases of the repeating voltage waveform.

The one or more devices may comprise at least one of:

(i) an ion trap, an analytical ion trap, or an ion guide arranged upstream of the quadrupole device;

(ii) one or more ion attenuators arranged upstream of the quadrupole device;

(iii) one or more voltage sources configured to apply a DC voltage to the quadrupole device;

(iv) an ion packetiser configured to form packets of ions arranged upstream of the quadrupole device; and (v) a pulsed ion source arranged upstream of the quadrupole device.

The quadrupole device may comprise a quadrupole mass filter configured to select and/or filter ions according to their mass to charge ratio.

The one or more voltage sources may be configured to apply one or more DC voltages to the quadrupole device.

According to an aspect there is provided an analytical instrument such as a mass and/or ion mobility spectrometer comprising the apparatus described above.

The main drive voltage may comprise an (quadrupolar) RF drive voltage. The main drive voltage may comprise a digital drive voltage.

The one or more auxiliary drive voltages may comprise one or more (quadrupolar) AC drive voltages. The one or more auxiliary drive voltages may comprise one or more digital drive voltages. The one or more auxiliary drive voltages may comprise one or more quadrupolar and/or parametric voltages.

The one or more auxiliary drive voltages may comprise two or more auxiliary drive voltages.

The main drive voltage may have a main drive voltage frequency Ω; and the two or more auxiliary drive voltages may comprise a first auxiliary drive voltage having a first frequency $\omega_{ex1}$, and a second auxiliary drive voltage having a second different frequency $\omega_{ex2}$, wherein the main drive voltage frequency Ω and the first and second frequencies $\omega_{ex1}$, $\omega_{ex2}$ may be related by $\omega_{ex1}=v_1\Omega$, and $\omega_{ex2}=v_2\Omega$, where $v_1$ and $v_2$ are constants.

The first and second auxiliary drive voltages may comprise (i) a first auxiliary drive voltage pair type, wherein $v_1=v$ and $v_2=1-v$; (ii) a second auxiliary drive voltage pair type, wherein $v_1=v$ and $v_2=1+v$; (iii) a third auxiliary drive voltage pair type, wherein $v_1=1-v$ and $v_2=2-v$; (iv) a fourth auxiliary drive voltage pair type, wherein $v_1=1+v$ and $v_2=2+v$; (v) a fifth auxiliary drive voltage pair type, wherein $v_1=1+v$ and $v_2=2+v$; or (vi) a sixth auxiliary drive voltage pair type, wherein $v_1=1+v$ and $v_2=2+v$.

The two or more auxiliary drive voltages may comprise a first auxiliary drive voltage having a first amplitude $V_{ex1}$, and a second auxiliary drive voltage having a second different amplitude $V_{ex2}$, wherein the absolute value of the ratio of the second amplitude to the first amplitude $V_{ex2}/V_{ex1}$ may be in the range 1-10.

According to various embodiments there is provided a method comprising:

- providing a first quadrupole ion guide;
- operating the quadrupole ion guide in an X-band, X-band-like, Y-band or Y-band-like mode of operation; and
- modulating the intensity of the ion beam entering the quadrupole ion guide such that the proportion of those ions with a favourable entry phase into the quadrupole is increased relative to those ions with an unfavourable entry phase;
- wherein the modulation is at or related to the frequency of the full repeating waveform.

BRIEF DESCRIPTION OF THE DRAWINGS

Various embodiments will now be described, by way of example only, and with reference to the accompanying drawings in which.

DETAILED DESCRIPTION

Various embodiments are directed to a method of operating a quadrupole device such as a quadrupole mass filter.

Figure 1:
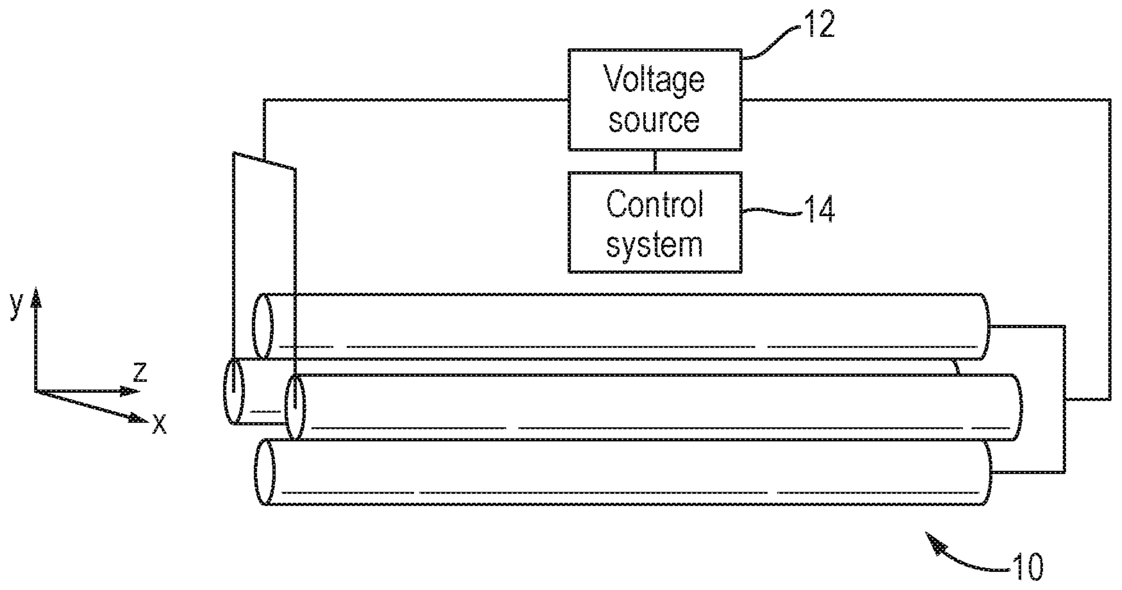
FIG. 1 shows schematically a quadrupole mass filter in accordance with various embodiments.

As illustrated schematically in FIG. 1, the quadrupole device 10 may comprise a plurality of electrodes such as four electrodes, for example, rod electrodes, which may be arranged to be parallel to one another. The quadrupole device may comprise any suitable number of other electrodes (not shown).

The rod electrodes may be arranged so as to surround a central (longitudinal) axis of the quadrupole (z-axis) (that is, that extends in an axial (z) direction) and to be parallel to the axis (parallel to the axial- or z-direction).

Each rod electrode may be relatively extended in the axial (z) direction. Plural or all of the rod electrodes may have the same length (in the axial (z) direction). The length of one or more or each of the rod electrodes may have any suitable value, such as for example (i)<100 mm; (ii) 100-120 mm; (iii) 120-140 mm; (iv) 140-160 mm; (v) 160-180 mm; (vi) 180-200 mm; or (vii)>200 mm.

Plural or all of the rod electrodes may be aligned in the axial (z) direction.

Each of the plural extended electrodes may be offset in the radial (r) direction (where the radial direction (r) is orthogonal to the axial (z) direction) from the central axis of the ion guide by the same radial distance (the inscribed radius) $r_0$, but may have different angular (azimuthal) displacements (with respect to the central axis) (where the angular direction (Θ) is orthogonal to the axial (z) direction and the radial (r) direction). The quadrupole inscribed radius $r_0$ may have any suitable value, such as for example (i)<3 mm; (ii) 3-4 mm; (iii) 4-5 mm; (iv) 5-6 mm; (v) 6-7 mm; (vi) 7-8 mm; (vii) 8-9 mm; (viii) 9-10 mm; or (ix)>10 mm.

Each of the plural extended electrodes may be equally spaced apart in the angular (Θ) direction. As such, the electrodes may be arranged in a rotationally symmetric manner around the central axis. Each extended electrode may be arranged to be opposed to another of the extended electrodes in the radial direction. That is, for each electrode that is arranged at a particular angular displacement $\Theta_n$ with respect to the central axis of the ion guide, another of the electrodes is arranged at an angular displacement $\Theta_n\pm180°$.

Thus, the quadrupole device 10 (for example, quadrupole mass filter) may comprise a first pair of opposing rod electrodes both placed parallel to the central axis in a first (x) plane, and a second pair of opposing rod electrodes both placed parallel to the central axis in a second (y) plane perpendicularly intersecting the first (x) plane at the central axis.

The quadrupole device may be configured (in operation) such that at least some ions are confined within the ion guide in a radial (r) direction (where the radial direction is orthogonal to, and extends outwardly from, the axial direction). At least some ions may be radially confined substantially along (in close proximity to) the central axis. In use, at least some ions may travel though the ion guide substantially along (in close proximity to) the central axis.

As will be described in more detail below, in various embodiments (in operation) plural different voltages are applied to the electrodes of the quadrupole device 10, for example, by one or more voltage sources 12. One or more or each of the one or more voltage sources 12 may comprise an analogue voltage source and/or a digital voltage source.

As shown in FIG. 1, according to various embodiments, a control system 14 may be provided. The one or more voltage sources 12 may be controlled by the control system 14 and/or may form part of the control system 12. The control system may be configured to control the operation of the quadrupole 10 and/or voltage source(s) 12, for example, in the manner of the various embodiments described herein. The control system 14 may comprise suitable control circuitry that is configured to cause the quadrupole 10 and/or voltage source(s) 12 to operate in the manner of the various embodiments described herein. The control system may also comprise suitable processing circuitry configured to perform any one or more or all of the necessary processing and/or post-processing operations in respect of the various embodiments described herein.

As shown in FIG. 1, each pair of opposing electrodes of the quadrupole device 10 may be electrically connected and/or may be provided with the same voltage(s). A first phase of one or more or each (RF or AC) drive voltage may be applied to one of the pairs of opposing electrodes, and the opposite phase of that voltage (180° out of phase) may be applied to the other pair of electrodes. Additionally or alternatively, one or more or each (RF or AC) drive voltage may be applied to only one of the pairs of opposing electrodes. In addition, a DC potential difference may be applied between the two pairs of opposing electrodes, for example, by applying one or more DC voltages to one or both of the pairs of electrodes.

Thus, the one or more voltage sources 12 may comprise one or more (RF or AC) drive voltage sources that may each be configured to provide one or more (RF or AC) drive voltages between the two pairs of opposing rod electrodes. In addition, the one or more voltage sources 12 may comprise one or more DC voltage sources that may be configured to supply a DC potential difference between the two pairs of opposing rod electrodes.

The plural voltages that are applied to (the electrodes of) the quadrupole device 10 may be selected such that ions within (for example, travelling through) the quadrupole device 10 having a desired mass to charge ratio or having mass to charge ratios within a desired mass to charge ratio range will assume stable trajectories (that is, will be radially or otherwise confined) within the quadrupole device 10, and will therefore be retained within the device and/or onwardly transmitted by the device. Ions having mass to charge ratio values other than the desired mass to charge ratio or outside of the desired mass to charge ratio range may assume unstable trajectories in the quadrupole device 10, and may therefore be lost and/or substantially attenuated. Thus, the plural voltages that are applied to the quadrupole device 10 may be configured to cause ions within the quadrupole device 10 to be selected and/or filtered according to their mass to charge ratio.

As described above, in conventional ("normal") operation, mass or mass to charge ratio selection and/or filtering is achieved by applying a single RF voltage and a resolving DC voltage to the electrodes of the quadrupole device 10.

In this case, the total applied potential $V_n(t)$ can be expressed as:

$$V_n(t)=U-V_{RF}\cos(\Omega t), \tag{1}$$

where U is the amplitude of the applied resolving DC potential, $V_{RF}$ is the amplitude of the main RF waveform, and $\Omega$ is the frequency of the main RF waveform.

Accordingly, the total applied waveform repeats with a period of:

$$T=1/\Omega, \tag{2}$$

that is, a single cycle of the total applied waveform takes a time of T to complete, such that the applied voltage at time t, $V_n(t)$, is equal to the applied voltage at time t+T:

$$V_n(t)=V_n(t+T) \tag{3}$$

Applying a single auxiliary quadrupolar AC excitation voltage to a quadrupole device 10 in addition to the confining RF and resolving DC voltages can alter the stability diagram such that new regions of stability or "islands of stability" are produced.

This is illustrated by FIG. 2. FIG. 2 shows stability diagrams (in a, q dimensions) resulting from the application of a single auxiliary quadrupolar excitation waveform of the form $V_{ex}\cos(\omega_{ex}t)$ to the quadruole device 10 (in addition to the main quadrupolar RF and DC voltages (according to Equation 1)).

For operation of the quadrupole device 10 in this mode, the total applied quadrupolar potential $V_{xb}(t)$ can be expressed as:

$$V_{xb}(t)=U-V_{RF}\cos(\Omega t)-V_{ex}\cos(\omega_{ex}t+\alpha_{ex}),$$

where U is the amplitude of the applied resolving DC potential, $V_{RF}$ is the amplitude of the main quadrupolar RF waveform, is the frequency of the main quadrupolar RF waveform, $V_{ex}$ is the amplitude of the auxiliary quadrupolar waveform, $\omega_{ex}$ is the frequency of the auxiliary quadrupolar waveform, and $\alpha_{ex}$ is the initial phase of the auxiliary quadrupolar waveform with respect to the phase of the main quadrupolar RF voltage.

The dimensionless parameters for the auxiliary waveform, $q_{ex}$, a, and q may be defined as:

$$q_{ex}=\frac{4eV_{ex}}{M\Omega^2r_0^2},$$

$$a=\frac{8eU}{M\Omega^2r_0^2},\text{ and}$$

$$q=\frac{4eV_{RF}}{M\Omega^2r_0^2},$$

where M is the ion mass and e is its charge.

The frequency $\omega_{ex}$ of the auxiliary quadrupolar excitation may be expressed as a fraction of the main confining RF frequency $\Omega$ in terms of a dimensionless base frequency v:

$$\omega_{ex}=\nu\Omega.$$

Figure 2A:
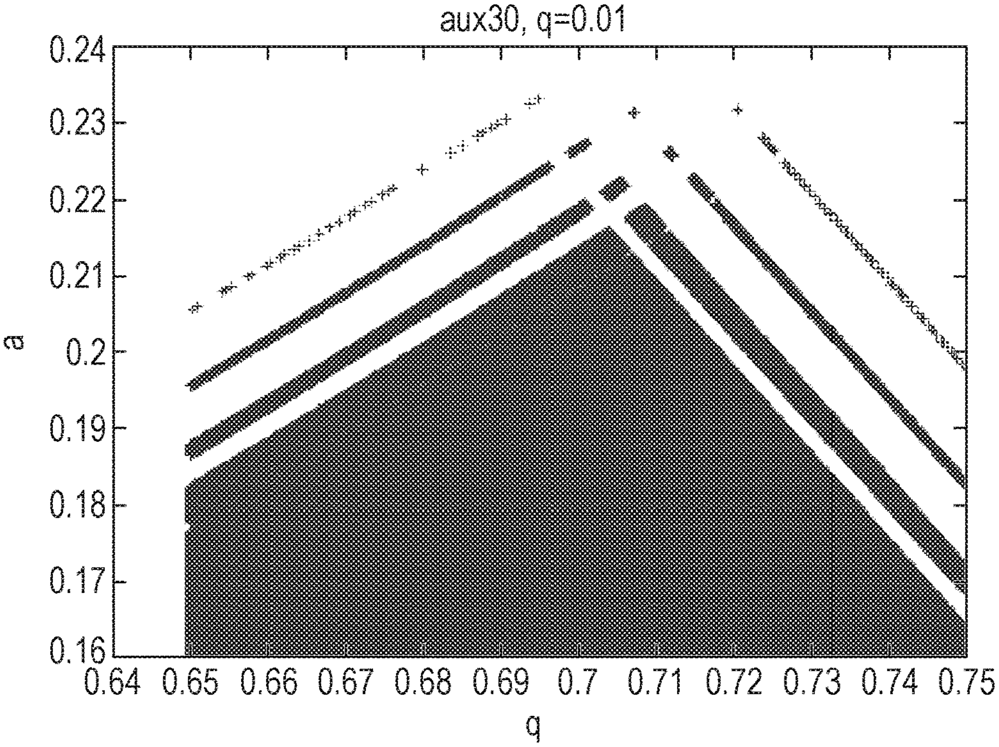
FIGS. 2A and 2B show stability diagrams for a quadrupole mass filter operating in X-band-like modes of operation in which a single auxiliary excitation waveform is applied to the quadrupole mass filter.
Figure 2B:
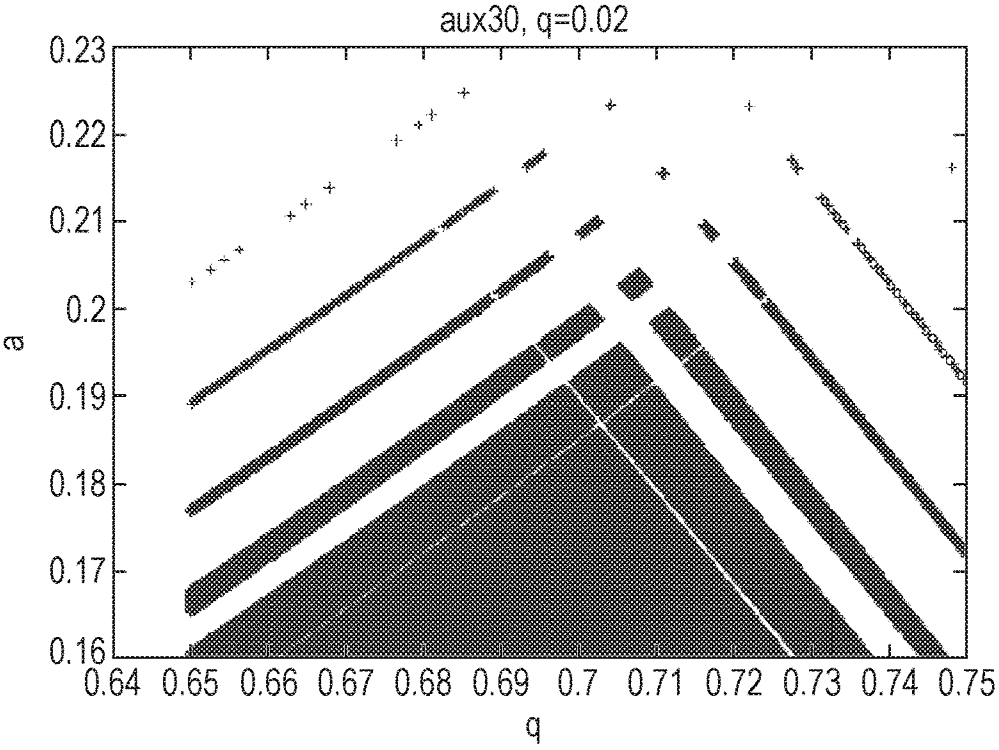

In the example depicted in FIG. 2A, v=1/30 and $q_{ex}$=0.01. In the example depicted in FIG. 2B, v=1/30 and $q_{ex}$=0.02.

According to various embodiments, the amplitude of the resolving DC potential U and the amplitude of the main quadrupole waveform $V_{RF}$ may be altered so that the ratio of the amplitude of the resolving DC potential to the amplitude of the main quadrupole waveform, $2U/V_{RF}$ (=a/q), is constant. The line corresponding to a fixed a/q ratio is defined as the so-called operating line, or "scan line".

As can be seen from FIG. 2, the application of the single auxiliary excitation results in the formation a number of different islands of stability. It may be desirable to operate the quadrupole device 10 in any one or more of these different islands of stability. For example, one or more of the islands of stability may exhibit X-band, X-band-like (or Y-band, or Y-band-like) properties.

In FIG. 2, the band furthest to the right may be considered as being the "X-band" for this single auxiliary excitation mode of operation. The band parallel to and to the left of this X-band may also display X-band-like properties. For example the stability boundaries at either edge of this band may be x-direction instabilities, and so it may have X-band-like properties, and comparable acceptance. This may also be the case for the next band to the left, and so on.

Operation of the quadrupole device 10 in any one of these different islands of stability can be achieved by appropriate selection of U and $V_{RF}$ such that the scan line intersects the desired island of stability.

As described above, the addition of two quadrupolar or parametric excitations $\omega_{ex1}$ and $\omega_{ex2}$ (of a particular form) (that is, in addition to the (main) RF voltage and the resolving DC voltage) can produce a stability region near the tip of the stability diagram (in a, q dimensions) characterized in that instability at the upper and lower mass to charge ratio (m/z) boundaries of the stability region is in a single direction (for example, in the x or y direction).

In particular, with an appropriate selection of the excitation frequencies $\omega_{ex1}$ $\omega_{ex2}$ and amplitudes $V_{ex1}$, $V_{ex2}$ of the two additional AC excitations, the influence of the two excitations can be mutually cancelled for ion motion in either the x or y direction, and a narrow and long band of stability can be created along the boundary near the top of the first stability region (the so-called "X-band" or "Y-band").

The quadrupole device 10 can be operated in either the X-band mode or the Y-band mode, but operation in the X-band mode is particularly advantageous for mass filtering as it results in instability occurring in very few cycles of the main RF voltage, thereby providing several advantages including: fast mass separation, higher mass to charge ratio (m/z) resolution, tolerance to mechanical imperfections, tolerance to initial ion energy and surface charging due to contamination, and the possibility of miniaturizing or reducing the size of the quadrupole device 10.

For operation of the quadrupole device 10 in the X-band mode, the total applied potential $V_{xb}(t)$ can be expressed as:

$$V_{xb}(t)=U-V_{RF}\cos(\Omega t)-V_{ex1}\cos(\omega_{ex1}t+\alpha_{ex1})+V_{ex2}\cos(\omega_{ex2}t+\alpha_{ex2}), \quad (4)$$

where U is the amplitude of the applied resolving DC potential, $V_{RF}$ is the amplitude of the main RF waveform, $\Omega$ is the frequency of the main RF waveform, $V_{ex1}$ and $V_{ex2}$ are the amplitudes of the first and second auxiliary waveforms, $\omega_{ex1}$ and $\omega_{ex2}$ are the frequencies of the first and second auxiliary waveforms, and $\alpha_{ex1}$ and $\alpha_{ex2}$ are the initial phases of the two auxiliary waveforms with respect to the phase of the main RF voltage.

Accordingly, the total applied waveform repeats with a period of:

$$\Theta=1/\nu\Omega=T/\nu \quad (5)$$

that is, a single cycle of the total applied waveform takes a time of $\Theta$ to complete, such that the applied voltage at time t, $V_{xb}(t)$, is equal to the applied voltage at time t+$\Theta$:

$$V_{xb}=V_{xb}(t+\Theta). \quad (6)$$

The dimensionless parameters for the nth auxiliary waveform, $q_{ex(n)}$, a, and q may be defined as:

$$q_{ex(n)}=\frac{4eV_{ex(n)}}{M\Omega^2 r_o^2},$$

$$a=\frac{8eU}{M\Omega^2 r_0^2}, \text{ and}$$

$$q=\frac{4eV_{RF}}{M\Omega^2 r_0^2},$$

where M is the ion mass and e is its charge.

The phase offsets of the auxiliary waveforms $\alpha_{ex1}$ and $\alpha_{ex2}$ may be related to each other by:

$$\alpha_{ex2}=2\pi-\alpha_{ex1}.$$

Hence, the two auxiliary waveforms may be phase coherent (or phase locked), but free to vary in phase with respect to the main RE voltage.

The frequencies of the two parametric excitations $\omega_{ex1}$ and $\omega_{ex2}$ can be expressed as a fraction of the main confining RE frequency C) in terms of a dimensionless base frequency v:

$$\omega_{ex1}=\nu_1\Omega, \text{ and } \omega_{ex2}=\nu_2\Omega.$$

Examples of possible excitation frequencies and relative excitation amplitudes ($q_{ex2}/q_{ex1}$) for X-band operation are shown in Table 1. The base frequency v is typically between 0 and 0.1. Typically, $v_1$=v and $v_2$=1−v, although, as shown in Table 1, other combinations are possible. The optimum value of the ratio $q_{ex2}/q_{ex1}$ depends on the magnitude of $q_{ex1}$ and $q_{ex2}$ and the value of the base frequency v, and is therefore not fixed.

TABLE 1

| | I | II | III | IV | V | VI |
|---|---|---|---|---|---|---|
| $v_1$ | v | v | 1 − v | 1 − v | 1 + v | 1 + v |
| $v_2$ | 1 − v | v + 1 | 2 − v | 2 + v | 2 − v | 2 + v |
| $q_{ex2}/q_{ex1}$ | ~2.9 | ~3.1 | ~7.1 | ~9.1 | ~6.9 | ~8.3 |

The optimum ratio of the amplitudes of the two additional excitation voltages, expressed as the ratio of the dimensional parameters $q_{ex1}$ and $q_{ex2}$ (in Table 1), is dependent on the excitation frequencies chosen. Increasing or decreasing the amplitude of excitation while maintaining the optimum amplitude ratio results in narrowing or widening of the stability band and hence increases or decreases the mass resolution of the quadrupole device 10.

Figure 3:
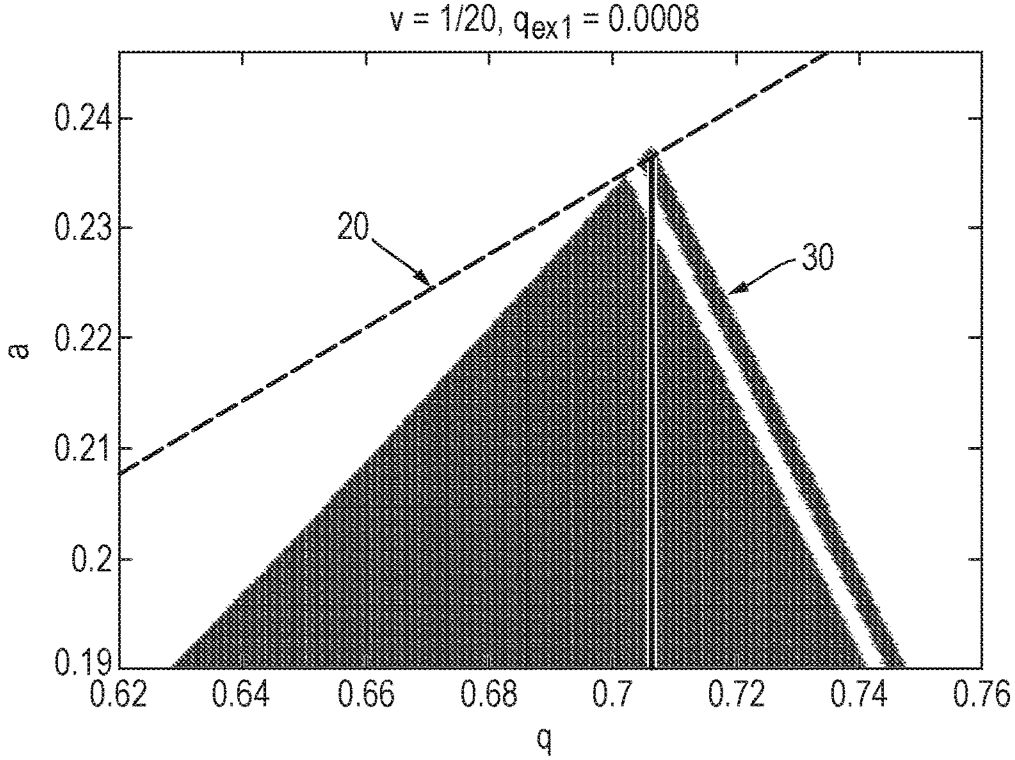
FIG. 3 shows a stability diagram for a quadrupole mass filter operating in an X-band mode of operation.

FIG. 3 shows simulated data for the tip of the stability diagram (in a, q space) for X-band operation. X-band waveforms of the type $v_1$=v, and $v_2$=(1−v) (i.e. Type I in Table 1) were used.

In the example of FIG. 3, $v=1/20$, $v_1=v$, $v_2=(1-v)$, $q_{ext1}=0.0008$, and $q_{ext2}/q_{ext1}=2.915$. The operating line 20, i.e. where the ratio a/q is constant, is shown intersecting the X-band 30.

Although operation of the quadrupole device 10 in a mode of operation in which a repeating voltage waveform comprising a main drive voltage and at least one auxiliary drive voltage is applied to the quadrupole device 10 (such as in the single auxiliary excitation mode of operation, or in the X-band or Y-band mode of operation) has a number of advantages (as described above), the inventors have recognised that further improvements can be made.

For example, whilst operating a quadrupole in one of these modes of operation can allow greater resolution to be achieved (for example, compared to the "normal" mode), the transmission characteristics of the quadrupole may not be significantly improved.

Figure 4:
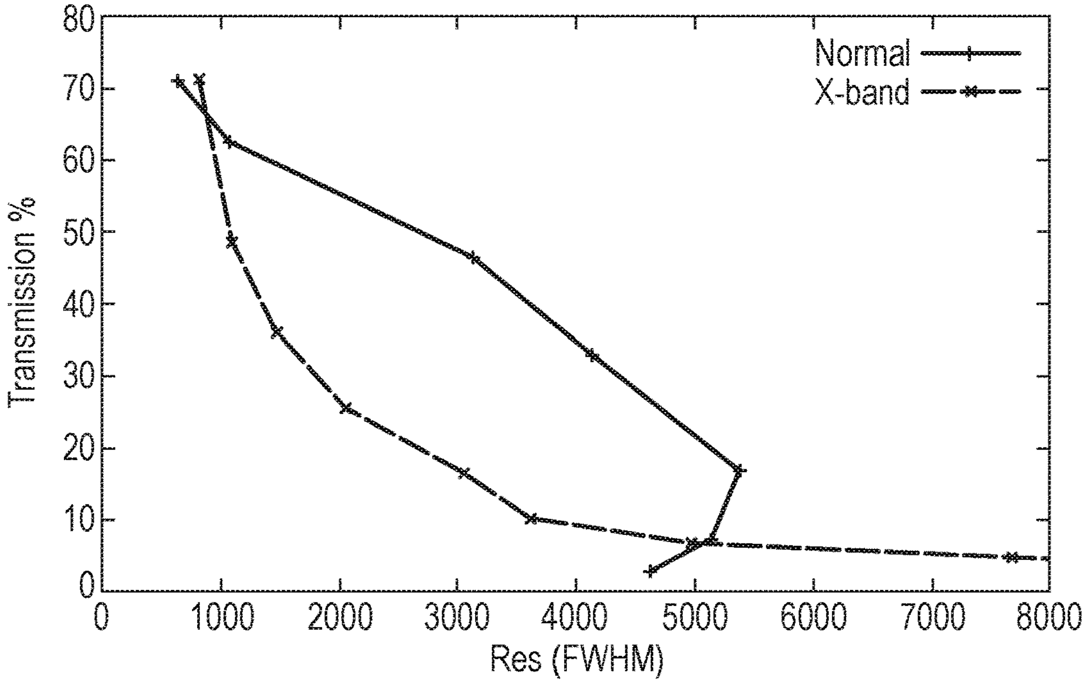
FIG. 4 shows plots of transmission versus resolution for simulations comparing a quadrupole operating in a normal mode of operation with the quadrupole operating in an X-band mode of operation.

This is illustrated by FIG. 4. FIG. 4 shows plots of transmission versus resolution for 3D simulations of a quadrupole operating in an X-band mode of operation and the quadrupole operating in a normal mode of operation. As can be seen from FIG. 4, in these simulations the resolution in the normal mode of operation is limited to about 5000 (where the resolution is defined as (m/z)/(Δm/z), where Δm/z is the FWHM (full-width-half-maximum)), whereas the X-band mode of operation is capable of much higher resolutions (>5000). At low values of resolution (<1000), the X-band mode and normal mode have comparable transmission values. However, in an intermediate resolution regime, between about 1000 and 5000, the normal mode of operation exhibits greater transmission compared to the X-band mode of operation.

Typically, quadrupole mass filters are operated with a constant peak width (for example during a scan, or otherwise) across the mass to charge ratio (m/z) range, that is, so that the resolution is varied across the range. Thus, for at least part of the mass range, a quadrupole operating in an X-band mode of operation would exhibit lower transmission than it would do it if were operating in an equivalent normal mode of operation (with the same resolution and/or peak width).

The inventors have recognised that one factor that can have a strong effect on the transmission of ions through the quadrupole is the point (in time) during a (single) cycle of the voltage waveform (that is, the phase) at which ions initially experience the quadrupolar field. In other words, quadrupole mass filters exhibit phase dependent acceptance characteristics. This is because, in particular, the maximum amplitude of radial (that is, x and/or y direction) ion oscillation in the quadrupole (that is, as the ions pass through the quadrupole) depends on the initial phase experienced by the ions.

Ions entering the quadrupole with mass to charge ratio values that give stable motion in the quadrupolar field can still be lost to the rods if their excursions in position exceed the radius $r_0$ of the quadrupole. The trajectory of ions within the quadrupole depends on their initial position and velocity in the x and y directions, and the phase of the RF voltage at the time that they enter the quadrupole field.

Accordingly, by controlling the initial phase of the voltage waveform that ions initially experience, the maximum amplitude of ion oscillation can be controlled, for example, can be reduced or minimised (for example, relative to other possible values of initial phase), for example, so as to reduce the number of ions that collide with the rods of the quadrupole, to thereby increase ion transmission through the quadrupole.

Figure 5A:
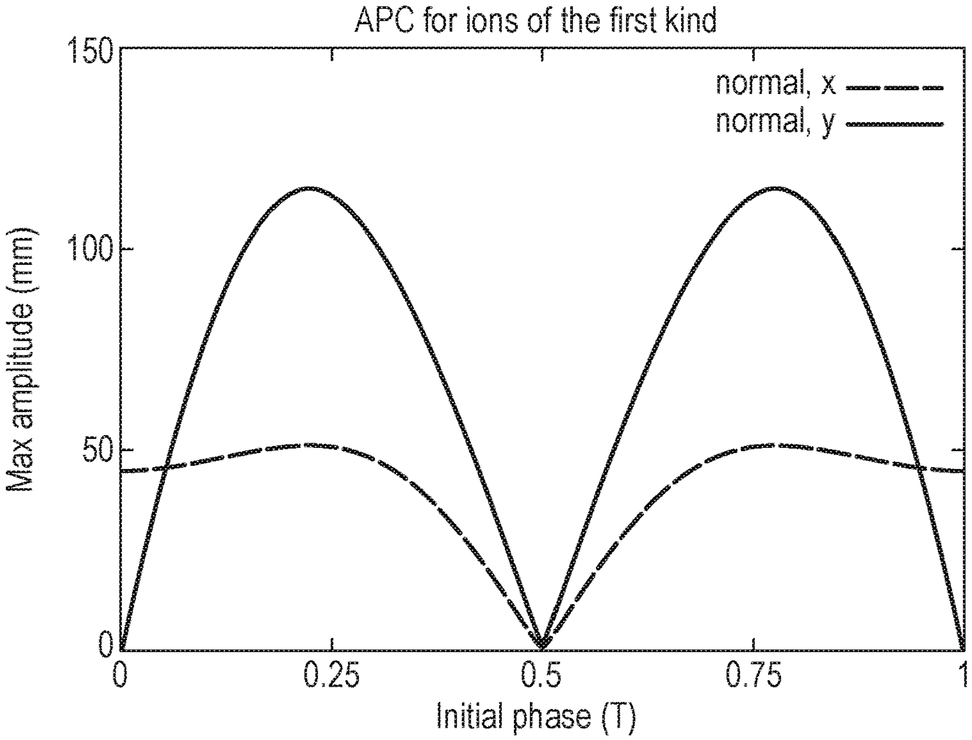
FIG. 5A shows a plot of the Amplitude Phase Characteristic ("APC") versus phase for a quadrupole operating in a normal mode of operation for "ions of the first kind"
Figure 5B:
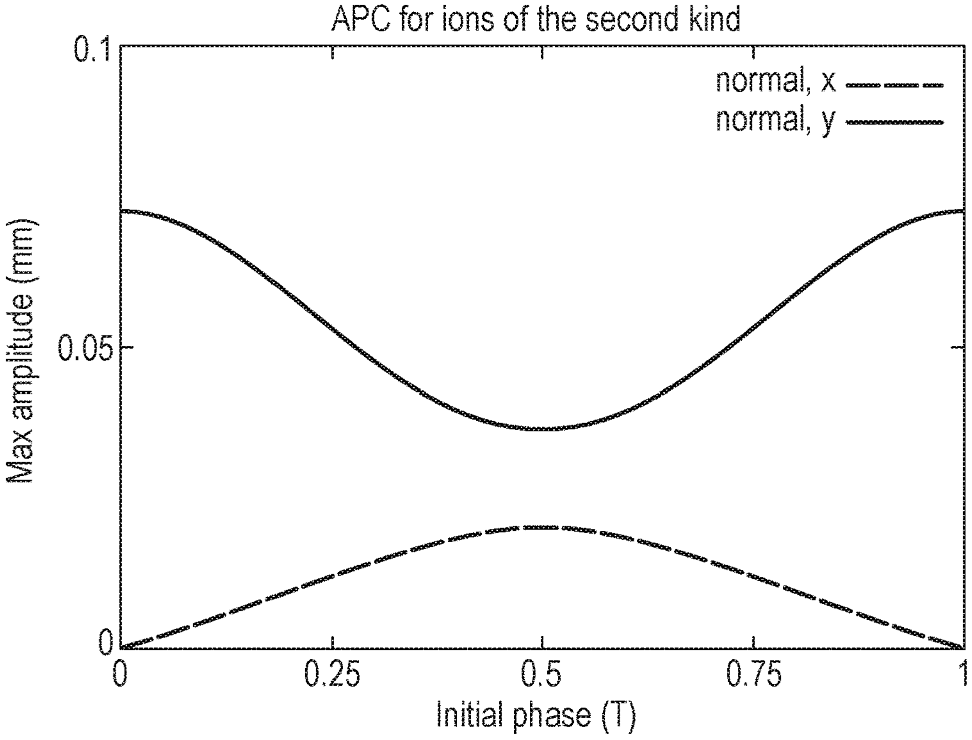
FIG. 5B shows a plot of the Amplitude Phase Characteristic ("APC") versus phase for a quadrupole operating in a normal mode of operation for "ions of the second kind"

This is illustrated by FIGS. 5A and 5B for the case of a quadrupole operating in normal mode of operation, in which a waveform of the form of equation (1) is applied to the quadrupole. An initial main RF phase of between 0 and 2π corresponds to ions with entry times between 0 and T.

FIGS. 5A and 5B show numerically calculated Amplitude Phase Characteristic ("APC") plots in the x- and y-axes (as defined in FIG. 1). Each APC curve shows the maximum amplitude of ion oscillation of an ion that is introduced into the quadrupole field at a given initial phase in the RF cycle, expressed as a fraction of the total RF period, T. The APC can also depend on the voltage waveform and the location in the q/a stability diagram, for example.

The maximum amplitude of ion oscillation is inversely proportional to acceptance. Thus a lower maximum oscillation amplitude indicates a higher acceptance or transmission, and correspondingly a higher maximum oscillation amplitude indicates a lower acceptance or transmission. Thus, it is desirable to introduce ions into the quadrupole at an initial phase of the voltage waveform corresponding to a minimum in the APC curve, to thereby improve transmission through the quadrupole.

In order to examine the effects of ion position and velocity on the APC plots independently of each other, FIGS. 5A and 5B show numerical experimental results for two sets of initial conditions in both x- and y-axes. FIG. 5A shows simulation results for "ions of the first kind", which have an initial radial position (x or y) within the quadrupole of +1 mm and zero initial radial velocity. FIG. 5B shows simulation results for "ions of the second kind", which have zero initial radial position and +1 m/s initial radial velocity (x' or y'). The other parameters of the simulations of FIGS. 5A and 5B are equal, and set to $r_0=5.33$ mm, rod length=130 mm, Ω=1 MHz, m/z=556, and a resolution of approximately 1000.

As can be seen from FIG. 5A, in the x-axis the APC plot for ions with a radial position of x=1 mm and with zero initial radial voltage ("ions of the first kind") has a minimum at an initial phase of 0.5 T. Similarly, in the y-axis, with radial position y=1 mm and with zero initial radial voltage, the APC plot also has a minimum at 0.5 T. Therefore, the acceptance of an ion with a radial position of 1 mm and with zero initial radial voltage will be maximized (increased) when the ion enters the quadrupole at an initial RF phase of 0.5 T.

As shown FIG. 5B, in the y-axis the APC plot for ions with zero radial position and with an initial radial voltage of y'=1 m/s ("ions of the second kind") also has a minimum at an initial phase of 0.5 T initial phase. In the x-axis, however, the APC plot for ions with zero radial position and with an initial radial voltage of x'=1 m/is ("ions of the second kind") has a minimum at an initial phase of 0, and has a maximum at 0.5 T.

Accordingly, "ions of the second kind" introduced into the quadrupole operating in normal mode at an initial phase of 0.5 T, will experience minimum oscillations in the y-axis but maximum oscillations in the x-axis. Similarly, "ions of the second kind" introduced into the quadrupole operating in normal mode at 0 initial phase, will experience maximum oscillations in the y-axis but minimum oscillations in the x-axis. Accordingly, there is no "optimum" initial phase that leads to maximum (increased) acceptance in both x- and y-axes.

It will be appreciated that while FIGS. 5A and 5B show numerical results for certain initial conditions, in practice ions entering the quadrupole (for example, from an upstream ion source or ion guide) will exhibit a distribution of positions and velocities in the x- and y-axes (for example, approximately a normal distribution). Since the incoming ion beam is spread in position and velocity in both axes, the "optimum" acceptance phase can be considered to be the phase at which APC is minimized overall for all of the four curves shown in FIGS. 5A and 5B.

It can be seen from FIGS. 5A and 5B that an initial phase of 0.5 T provides the highest acceptance in terms of x position, y position and y velocity, but the lowest acceptance in terms of x velocity. Accordingly, while there is no single initial phase which is "optimum" for each position and velocity, it may be expected that overall, the "optimum" acceptance phase (providing the highest transmission) will be 0.5 T.

Thus, the inventors have recognised that the transmission of ions through the quadrupole operating in the normal mode of operation would be increased if ions were arranged to enter the quadrupole at an initial phase of 0.5 T, as compared to the case where ions enter the quadrupole over all of the RF period T.

Accordingly, the inventors have envisaged pulsed ion entry or modulation into the quadrupole operating in a normal mode of operation to attempt to increase the proportion of ions arriving at or close to an "optimum" RF phase to thereby increase ion transmission through the quadrupole. However, for typical RF frequencies, the RF period T is in the order of 1 μs. The inventors have accordingly found that it is extremely challenging, if not impractical, to modulate or pulse ions into a quadrupole on such timescales, such that ions arrive within a desired small portion of the RF period.

Figure 6A:
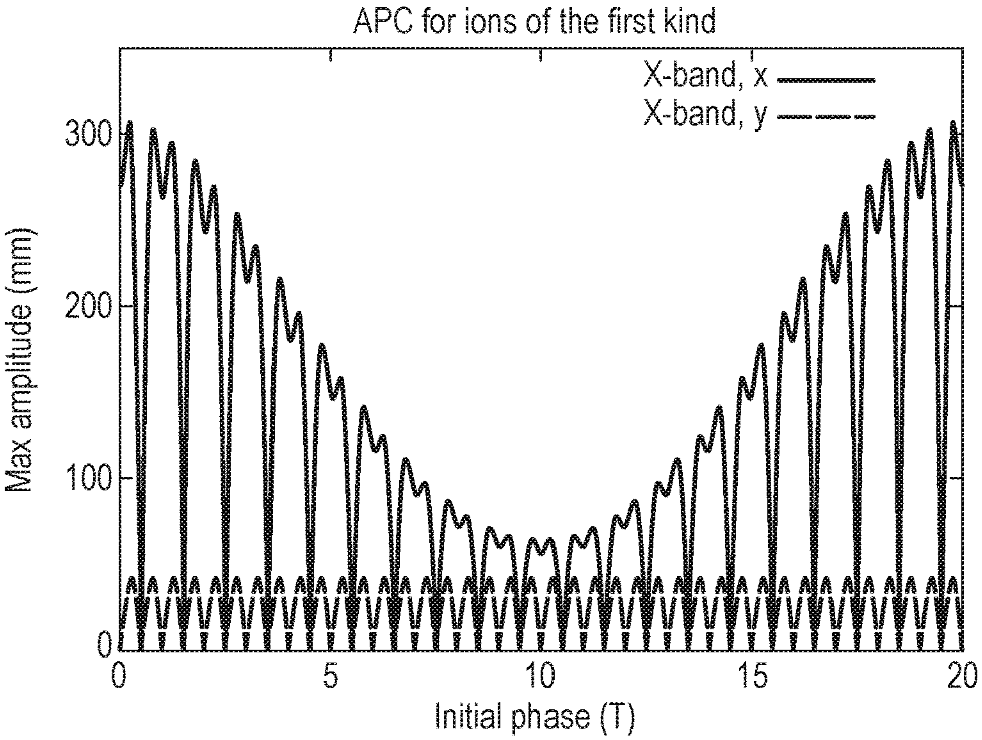
FIG. 6A shows a plot of the Amplitude Phase Characteristic ("APC") versus phase for a quadrupole operating in an X-band mode of operation for "ions of the first kind"
Figure 6B:
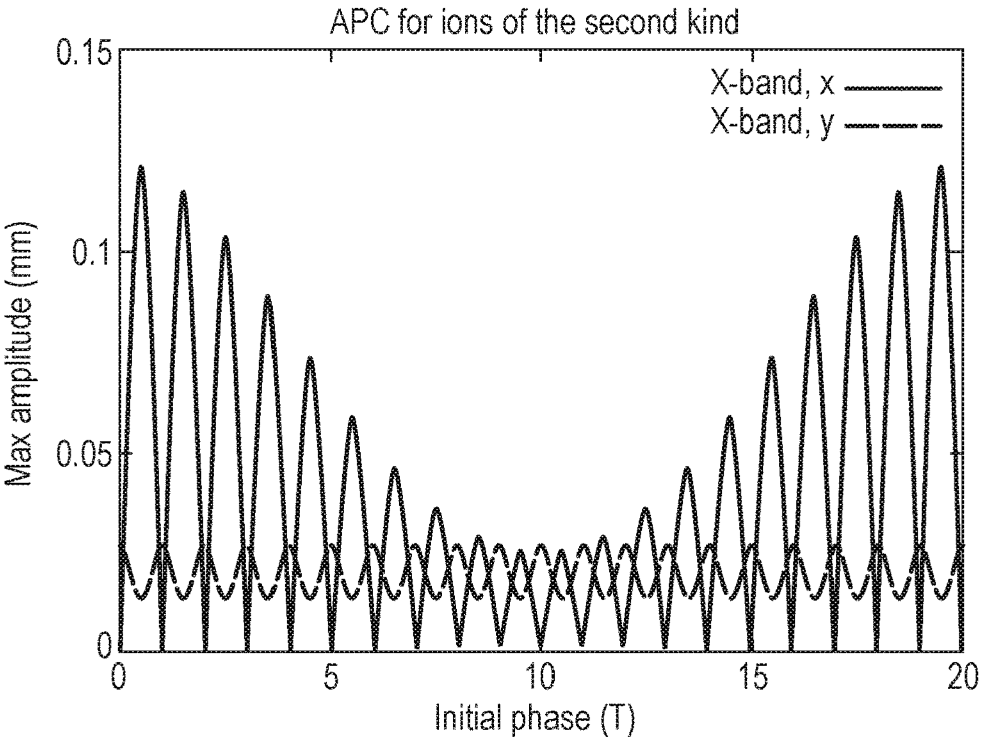
FIG. 6B shows a plot of the Amplitude Phase Characteristic ("APC") versus phase for a quadrupole operating in an X-band mode of operation for "ions of the second kind"

FIGS. 6A and 6B show numerically calculated Amplitude Phase Characteristic ("APC") plots for the X-band mode of operation in the x- and y-axes, in which a waveform of the form of equation (4) is applied to the quadrupole. The simulation parameters are set to the same values as for the normal mode of operation simulations shown in FIGS. 5A and 5B, that is, $r_0$=5.33 mm, rod length=130 mm, 0=1 MHz, m/z=556, and a resolution of approximately 1000. The parameters relating to the two X-band auxiliary drive voltages are set to v=0.05, $v_1=v\Omega$ and $v_2=(1-v)\Omega$. For simplicity of illustration, the waveform phases $a_{ex1}$ and are each taken to be zero. Thus, an initial full repeating waveform phase of between 0 and 2π corresponds to ions with entry times between 0 and Θ.

FIGS. 6A and 6B show APC curves plotted over the full X-band waveform period, Θ. For ease of comparison between FIGS. 6A and 6B and FIGS. 5A and 5B, the APC curves in FIGS. 6A and 6B are plotted as a function of the main RF period, T. Since, in this example, the full period of the X-band waveform is Θ=20 T, each APC curve is plotted from 0 to 20 T.

As can be seen from a comparison of FIG. 6A with FIG. 5A, in the case of the y-axis, the APC behaviour for "ions of the first kind" is essentially the same as for the normal mode of operation over the RF period T, but repeated 20 times over the full X-band period Θ. Moreover, each instance of the APC plot repeating is almost identical to each other instance of the APC plot repeating, that is, there is no significant structure on the timescale of the full X-band waveform.

As can be seen from a comparison of FIG. 6B and FIG. 5B, the same can be said in the case of the y-axis for "ions of the second kind". Thus, the y-axis APC behaviour for "ions of the second kind" is essentially the same as for the normal mode of operation over the RF period T, but repeated 20 times over the full X-band period Θ. Moreover, there is no significant structure on the timescale of the full X-band waveform.

It can also be seen by comparing FIGS. 5 and 6, that the maximum values for the y-axis APC curves are around 2.7 times lower for the X-band case than for the normal mode of operation. Hence a quadrupole operating in X-band mode of operation will exhibit improved acceptance in the y-axis, as compared to the quadrupole operating in the normal mode of operation.

Turning to the x-axis, as can be seen from FIG. 6A, the APC curve for "ions of the first kind" shows similar variation over each RF period T, as for the normal mode of operation, but repeated 20 times over the full X-band period Θ. However, in contrast to the behaviour for the normal mode of operation, the APC curve is modulated over the period of the full X-band waveform Θ(=20 T). This modulation is approximately sinusoidal, with a maximum at an initial phase of 0 and a minimum at Θ/2=10 T.

As can be seen from FIG. 6B, the same can be said in the case of the x-axis for "ions of the second kind". Thus, the x-axis APC behaviour for "ions of the second kind" for the X-band mode of operation differs from the normal mode of operation by an approximate sinusoidal modulation over the period of the full X-band waveform Θ(=20 T).

It can also be seen from FIG. 6A that in the case of the x-axis APC curve for "ions of the first kind" in the X-band mode of operation, the maximum value within each repeated portion of the APC curve varies from about 310 mm at the maximum of the modulation to about 65 mm at the minimum of the modulation. In comparison, FIG. 5A shows a maximum value for x-axis "ions of the first kind" in the normal mode of operation of about 51 mm. Thus, the x-axis APC maximum values for "ions of the first kind" in the X-band mode of operation are between about 6 times and 1.3 times larger than for the normal mode of operation.

As can be seen from FIG. 6B, in the case of the x-axis APC curve for "ions of the second kind" in the X-band mode of operation, the maximum value within each repeated portion of the APC curve varies from about 0.12 mm at the maximum of the modulation to about to about 0.025 mm at the minimum of the modulation. In comparison, FIG. 5B shows a maximum value for x-axis "ions of the second kind" in the normal mode of operation of about 0.02 mm. Thus, the x-axis APC maximum values for "ions of the second kind" in the X-band mode of operation are also between about 6 times and 1.3 times larger than for the normal mode of operation.

This means that ions entering the quadrupole operating in the X-band mode of operation with initial phases of between about 0 and T have much lower x-axis acceptance (about 6 times lower) than ions entering the quadrupole operating in the normal mode of operation with the same initial phases. For ions entering the quadrupole operating in the X-band mode of operation with initial phases of between 9 T and 10 T, however, the x-axis acceptance is only about 1.3 times lower than for ions entering the quadrupole operating normal mode of operation at the same initial phases.

The inventors have accordingly realised that it is possible to increase the transmission through a quadrupole operating in an X-band mode of operation by increasing the proportion of ions entering the quadrupole that initially experience a phase of the X-band repeating voltage waveform exhibiting improved acceptance characteristics. This also applies to other modes of operation in which a repeating voltage waveform comprising a main drive voltage and at least one auxiliary drive voltage is applied to the quadrupole device, such as X-band-like, Y-band and Y-band-like modes of operation.

Thus according to various embodiments, the intensity of ions (for example, an ion beam) passing into a quadrupole operating in a mode of operation in which a repeating voltage waveform comprising a main drive voltage and at least one auxiliary drive voltage is applied to the quadrupole device (such as an X-band(-like) or Y-band(-like) mode of operation) is varied in time (modulated, pulsed) such that more of the ions enter the quadrupole and initially experience a selected range of phases of the (X-band(-like) or Y-band(-like)) repeating voltage waveform than would do without the intensity of the ions being varied in time. According to various embodiments, the selected range of phases exhibits increased acceptance characteristics, as compared to other entry phases.

It will be appreciated that typically ions enter a quadrupole such that all phases are equally likely to be initially experienced by an ion. Thus, typically, over plural (many) cycles of a repeating voltage waveform, the proportion of ions which initially experience a certain range of phases of the repeating voltage waveform will be the same as the proportion of ions which initially experience any other range of phases (having the same width) of the repeating voltage waveform.

In contrast, according to various embodiments, ion intensity is varied with time such that all phases are no longer equally likely to be initially experienced by an ion entering the quadrupole, but instead the ion is more likely to initially experience a selected range of phases (exhibiting increased acceptance characteristics). Thus, according to various embodiments, the proportion of ions (over plural (many) cycles of a repeating voltage waveform) which initially experience the selected range of phases is greater than the proportion of ions which initially experience any other (non-overlapping) range of phases (having the same width).

Moreover, the inventors have found that, while in principle it would be possible to attempt to increase transmission through a quadrupole operating in a mode of operation in which a repeating voltage waveform comprising a main drive voltage and at least one auxiliary drive voltage is applied to the quadrupole device (such as an X-band(-like) or Y-band(like) mode of operation) by varying the intensity of a beam of ions on the timescale of the main RF period, T, in practice, as discussed above, this is extremely challenging, if not impractical, to do.

However, by comparing equations (2) and (5) above, it can be seen that for typical values of v (between about 0 and 0.1), the period of the total applied waveform when operating in an X-band mode of operation; Θ, will be at least 10 times longer than the period of the main RF (or the period of the total applied waveform when operating in a normal mode of operation), T. For example; in the above example, v=0.05 and T=1 μs, such that the period of the total applied X-band waveform $V_{xb}(t)$ is Θ=20 μs, that is, 20 times longer than the main RF period, T.

Thus, according to various embodiments, the intensity of ions (for example, an ion beam) entering a quadrupole operating in a mode of operation in which a repeating voltage waveform comprising a main drive voltage and at least one auxiliary drive voltage is applied to the quadrupole device (such as an X-band(-like) or Y-band(-like) mode of operation) is varied with time (modulated, pulsed) on the timescale of (synchronised with) the full (X-band(-like) or Y-band(-like)) repeating voltage waveform, Θ (for example, with a period equal to Θ) (as opposed to being modulated on the timescale of (synchronised with) the main RF drive voltage, T (for example, with a period equal to T)).

The inventors have found that ion intensity variation (modulation, pulsing) on such (longer) timescales is more readily achievable.

Furthermore, as can be seen from FIGS. 6A and 6B, on these (longer) timescales, the phase at which the APC plot is minimised is the same for both "ions of the first kind" and "ions of the second kind", that is, the APC plots are minimised at an initial phase of Θ/2=10 T. This is in contrast to the case illustrated in FIGS. 5A and 5B, where on the shorter RF timescales, there is no single "optimum" value of phase which minimises the APC plots for both "ions of the first kind" and "ions of the second kind".

Thus, in one axis of a quadrupole operating in the X-band mode of operation, ion acceptance is comparable to the quadrupole operating the normal mode, while in the other axis the ion acceptance is modulated over the timescale of the full repeating voltage waveform (for example, over Θ=20 μs). The modulation has the same structure in both position acceptance and velocity acceptance. Accordingly, the optimal phase of the full repeating voltage waveform is the same for both position and velocity acceptance. Accordingly, transmission is improved. Thus, according to various embodiments, the intensity variation (modulation, pulsing) is periodic with a period equal to the period of the (X-band (-like) or Y-band(-like)) repeating voltage waveform, Θ. That is, according to various embodiments, the period of the intensity variation is longer than the period of the RF drive voltage, T; for example, at least an order of magnitude (10 times) longer.

However, it should be noted here that strictly periodic intensity variation is not essential, and the intensity variation may be substantially periodic or phase coherent with the (X-band(-like) or Y-band(-like)) repeating voltage waveform.

For example, it would be possible for ion intensity to be different in different cycles of the repeating voltage waveform. For example, according to various embodiments, a first ion packet having a first intensity may initially experience the selected range of phases for a first cycle of the repeating voltage waveform, and a second, different ion packet having a second, different intensity may initially experience the selected range of phases for a second, different cycle of the repeating voltage waveform, and so on.

Moreover, ion packets need not enter the quadrupole during every cycle of the repeating voltage waveform, but may enter the quadrupole during any selected subset of cycles. For example, according to various embodiments, an ion packet is released at every other (or every third, etc.) desired (selected) phase window, leading, for example, to a release every 40 T (or 60 T, etc.) in the above example. Moreover, it would be possible for the subset of cycles not to have a repeating pattern.

Figure 7:
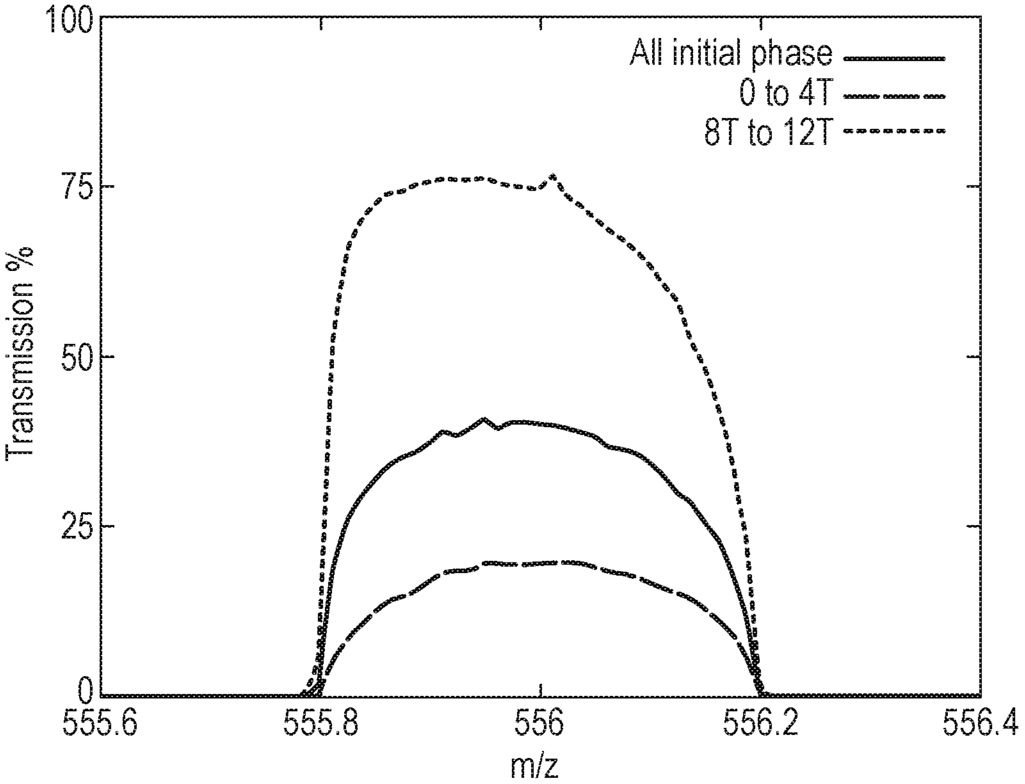
FIG. 7 shows numerical experimental results illustrating transmission through a quadrupole device operating in an X-band mode of operation according to various embodiments.

FIG. 7 shows numerical experimental data illustrating the effect on transmission of the various embodiments described herein for a quadrupole operating in an X-band mode of operation. The simulation parameters are set to the same values as for the simulations shown in FIG. 6, with rod length=130 mm, axial ion energy=0.5 eV, and 312 main RF cycles. Ions have initial normal distributions in position and velocity in both the x- and y-axes, with an x and y position standard deviations of 0.05 mm, and an x and y velocity standard deviations of 122 m/s. This corresponds to thermal ions at a temperature of 1000K. The auxiliary excitations and scan line are set to give a resolution of 1500.

As shown in FIG. 7, where ions enter the quadrupole with all initial RF phases being equally likely (that is, between 0 and 20 T), a maximum transmission of about 40% is observed. If the initial range of RF phases of the ions entering the quadrupole is restricted (by pulsing each cycle) to between 0 and 4 T (that is, a phase range exhibiting reduced ion acceptance) a maximum transmission of about 20% is observed.

If, however, according to various embodiments, the initial range of RF phases of the ions entering the quadrupole is restricted (by pulsing each cycle) to between 8 and 12 T (that is, a phase range exhibiting increased ion acceptance, centred on Θ/2), a maximum transmission of about 75% is observed. Accordingly, by restricting the initial RF phases of ions entering the quadrupole to a selected 4 T phase range (window) (that is, a 4 μs window in the present example), the transmission of the ions through the quadrupole is almost doubled.

Figure 8:
FIGS. 8, 9 and 10 show schematically various analytical instruments comprising a quadrupole device in accordance with various embodiments.

Variation of the intensity of the ions passing into the quadrupole device with time can be achieved in any suitable and desired manner. For example, FIG. 8 shows an arrangement according to various embodiments, in which ions are trapped in an ion guide 70 upstream of the quadrupole device 10. A voltage waveform phase locked to the (X-band (-like) or Y-band(-like)) repeating voltage waveform is then applied to an exit lens of the ion guide 70 to trap and release ions such that ions are released from the ion guide 70 at times that lead to them enter the quadrupole device 10 in the desired (selected) range of (X-band(-like) or Y-band(-like)) repeating voltage waveform phase values.

The voltage waveform applied to the exit lens is a sinusoidal DC voltage having a period equal to period of the (X-band(-like) or Y-band(-like)) repeating voltage waveform, Θ. In another embodiment, the voltage waveform applied to the exit lens is a stepped (for example, square wave) DC voltage having a period equal to period of the (X-band(-like) or Y-band(-like)) repeating voltage waveform, Θ.

Additionally or alternatively, the intensity variation may be achieved by attenuating ions passing into the quadrupole device. In this case, the variation is achieved by varying the attenuation of the ions. For example, a waveform applied to an attenuating element, for example, a lens, arranged at the entrance to the quadrupole device may be varied with time such that the intensity of ions passing into the quadrupole device is varied with time.

Additionally or alternatively, the intensity variation may be achieved by varying the ion energy (that is, the DC level) of the quadrupole and/or of a prefilter rod set. In this case, a DC voltage applied to the quadrupole device may be varied with time such that ions of interest are allowed to pass through the quadrupole device at the desired (selected) range of phases.

Additionally or alternatively, the intensity variation may be achieved by upstream packetisation of ions, for example in an ion guide upstream of the quadrupole device. For example, a T-wave ion guide may be used to generate ion packets. In this case, the ion packets may be arranged to exit the ion guide at times such that the ions enter the quadrupole at the desired (selected) phase windows.

Additionally or alternatively, the intensity variation may be achieved by arranging a pulsed ion source to deliver ion packets to the quadrupole device at times corresponding to the desired (selected) phase range.

Additionally or alternatively, the upstream ion trap or ion guide 70 may be an analytic ion trap or ion guide, that may be configured to release ions having a specified mass to charge ratio (m/z), or ions within a specified mass to charge ratio (m/z) range. The mass to charge ratio (m/z) of ions released by the ion trap or ion guide 70 may be aligned with the set mass of the quadrupole device 10. Ions may be released from the ion trap or ion guide 70 with appropriate timing so that the ions enter the quadrupole device 10 during a favourable phase of the repeating voltage waveform (as described above).

Other arrangements would be possible.

Thus, it will also be appreciated that while transmission through the quadrupole device may be maximised by arranging for substantially no ions to be passed into the quadrupole device at unfavourable phases (and so for substantially all ions to initially experience the desired (selected) phase range), this is not essential. For example, the proportion of ions entering the quadrupole in the ideal (selected) phase range may be increased relative to the proportion entering at other phases without the ion intensity dropping to zero at any point.

In various embodiments, the phase of the (X-band(-like) or Y-band(-like)) repeating voltage waveform may be known. In other embodiments, however, the phase of the (X-band(-like) or Y-band(-like)) repeating voltage waveform is not known. Thus, for example, the exit lens waveform may be only phase coherent with the main RF waveform. Thus according to various embodiments, the modulation phase offset (for example, of the exit lens waveform) is determined, for example, by (manual) tuning.

According to various embodiments, the phase offset (for example, of the exit lens waveform) is determined in an instrument set-up and/or calibration process. The inventors have moreover found that the phase offset may depend on mass to charge ratio. For example, elements present between the exit lens and the quadrupole (for example, pre-filter rods) may cause a time offset, which may be mass to charge ratio (m/z) dependent.

Thus according to various embodiments, a calibration function and/or look-up table relating the phase offset (of the exit lens voltage) to the mass to charge ratio (m/z) of the ion of interest is determined. The calibration function and/or look-up table may then be used such that the phase offset may be scanned when the quadrupole is operated in a scanning mode. The amplitude of the exit lens voltage may also be mass to charge ratio (m/z) dependent, and may be determined in a corresponding manner.

Although various embodiments above have been described in terms of the use of X-band stability conditions, it would also be possible to use Y-band stability conditions, e.g. in a corresponding manner, mutatis mutandi. A Y-band may be produced and used for mass to charge ratio (m/z) filtering (rather than an X-band) by application of suitable excitation frequencies.

Although the above has been described with particular reference to operating in an X-band or Y-band mode of operation in which two additional AC excitations are applied to the quadrupole device, it will be appreciated in various embodiments the quadrupole device is operated in a "single excitation" X-band(-like) or Y-band(-like) mode of operation using only a single additional AC excitation. In this case, the scan line may be lowered so as not to operate at the tip of the stability diagram. For example, the scan line may be operated in region "C" as defined in Sudakov, Such a scan line may cross other stable regions of the stability diagram and hence additional filtering may be required to avoid mass to charge ratio (m/z) interferences. Other regions may also be used, as desired. It will be appreciated, however, that such "single excitation" X-band(-like) or Y-band(-like) modes of operation can also benefit from the various advantages described herein, such as improved speed of ejection, resolution, and transmission behaviour.

Thus, according to various embodiments one auxiliary drive voltage is applied to the quadrupole device, which may effect an X-band, X-band-like, Y-band or Y-band-like mode of operation. An X-band-like (or Y-band-like) mode of operation may comprise a mode of operation in which the quadrupole device 10 is operated in a stability region for which instability (ejection) at the stability boundaries of the stability region may be in only the x- (or y-) direction.

The quadrupole device 10 (e.g. quadrupole mass filter) may be operated using one or more sinusoidal, e.g. analogue, RF or AC signals. However, it is also possible to operate the quadrupole device 10 using one or more digital signals, e.g. for one or more or all of the applied drive voltages. A digital signal may have any suitable waveform, such as a square or rectangular waveform, a pulsed EC waveform, a three phase rectangular waveform, a triangular waveform, a sawtooth waveform, a trapezoidal waveform, etc.

As described above, in various embodiments, plural different voltages are (simultaneously) applied to the electrodes of the quadrupole device 10, e.g. by the one or more voltage sources 12, comprising a main (RF or AC) drive voltage, one or more auxiliary (RF or AC) drive voltages and optionally one or more DC voltages. The plural voltages may be configured (selected) so as to correspond to an X-band, X-band-like, Y-band or Y-band-like stability condition.

The main drive voltage may have any suitable amplitude $V_{RF}$. The main drive voltage may have any suitable frequency $\Omega$, such as for example (i)<0.5 MHz; (ii) 0.5-1 MHz; (iii) 1-2 MHz; (iv) 2-5 MHz; or (v)>5 MHz. The main drive voltage may comprise an RF or AC voltage, and e.g. may take the form $V_{RF}\cos(\Omega t)$.

Equally, each of the one or more DC voltages may have any suitable amplitude U.

Each of the auxiliary drive voltage(s) may comprise an RF or AC voltage, and e.g. may take the form $V_{exn}\cos(\omega_{exn}t+\alpha_{exn})$, where $V_{exn}$ is the amplitude of the nth auxiliary drive voltage, $\omega_{exn}$ is the frequency of the nth auxiliary drive voltage, and $\alpha_{exn}$ is an initial phase of the nth auxiliary waveform with respect to the phase of the main drive voltage.

Each of the auxiliary drive voltage(s) may have any suitable amplitude $V_{exn}$, and any suitable frequency $\omega_{exn}$.

The relationships between the excitation frequencies $\omega_{exn}$ for pairs of auxiliary drive voltages (where present) may each correspond to the relationship between the excitation frequencies $\omega_{exn}$ for an X-band or Y-band pair of auxiliary drive voltages, e.g. as described above (e.g. those given above in Table 1).

The base frequency v may take any suitable value, such as for example (i) between 0 and 0.5; (ii) between 0 and 0.4; (iii) between 0 and 0.3; and/or (iv) between 0 and 0.2. In various particular embodiments, the base frequency v is between 0 and 0.1.

The quadrupole device 10 may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation; a Quantification mode of operation; and/or an Ion Mobility Spectrometry ("IMS") mode of operation.

In various embodiments, the quadrupole device 10 may be operated in a constant mass resolving mode of operation, i.e. ions having a single mass to charge ratio or single mass to charge ratio range may be selected and onwardly transmitted by the quadrupole mass filter. In this case, the various parameters of the plural voltages that are applied to the quadrupole device 10 (as described above) may be (selected and) maintained and/or fixed, as appropriate.

Alternatively, the quadrupole device 10 may be operated in a varying mass resolving mode of operation, i.e. ions having more than one particular mass to charge ratio or more than one mass to charge ratio range may be selected and onwardly transmitted by the mass filter.

For example, according to various embodiments, the set mass of the quadrupole device 10 may scanned, e.g. substantially continuously, e.g. so as to sequentially select and transmit ions having different mass to charge ratios or mass to charge ratio ranges. Additionally or alternatively, the set mass of the quadrupole device may altered discontinuously and/or discretely, e.g. between plural different values of mass to charge ratio (m/z).

In these embodiments, one or more or each of the various parameters of the plural voltages that are applied to the quadrupole device 10 (as described above) may be scanned, altered and/or varied, as appropriate.

In particular, in order to scan, alter and/or vary the set mass of the quadrupole device, the amplitude of the main drive voltage $V_{RF}$ and the amplitude of the DC voltage U may be scanned, altered and/or varied. The amplitude of the main drive voltage $V_{RF}$ and the amplitude of the DC voltage U may be increased or decreased in a continuous, discontinuous, discrete, linear, and/or non-linear manner, as appropriate. This may be done while maintaining the ratio of the main resolving DC voltage amplitude to the main RF voltage amplitude $\lambda=2U/V_{RF}$ constant or otherwise.

As transmission through the quadrupole device 10 is related to its resolution, it is often desirable to maintain a lower resolution at low mass to charge ratio (m/z) and higher resolution at higher mass to charge ratio (m/z). For example, it is common to operate a quadrupole mass filter with a fixed peak width (in Da) at each of the desired mass to charge ratio (m/z) values or over the desired mass to charge ratio (m/z) range.

Thus, according to various embodiments, the resolution of the quadrupole device 10 is scanned, altered and/or varied, e.g. over time. The resolution of the quadrupole device 10 may be varied in dependence on (i) mass to charge ratio (m/z) (e.g. the set mass of the quadrupole device); (ii) chromatographic retention time (RT) (e.g. of an eluent from which the ions are derived eluting from a chromatography device upstream of the quadrupole device); and/or (iii) ion mobility (IMS) drift time (e.g. of the ions as they pass through an ion mobility separator upstream or downstream of the quadrupole device 10).

The resolution of the quadrupole device 10 may be varied in any suitable manner. For example, one or more or each of the various parameters of the plural voltages that are applied to the quadrupole device 10 (as described above) may be scanned, altered and/or varied such that the resolution of the quadrupole device 10 is scanned, altered and/or varied.

According to various embodiments, the quadrupole device 10 may be part of an analytical instrument such as a mass and/or ion mobility spectrometer. The analytical instrument may be configured in any suitable manner.

Figure 9:
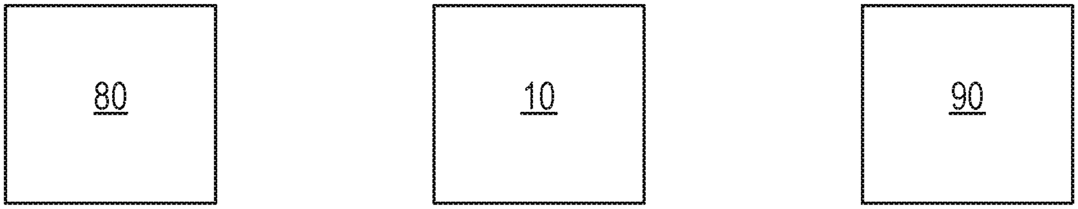

FIG. 9 shows an embodiment comprising an ion source 80, the quadrupole device 10 downstream of the ion source 80, and a detector 90 downstream of the quadrupole device 10.

Ions generated by the ion source 80 may be injected into the quadrupole device 10. The plural voltages applied to the quadrupole device 10 may cause the ions to be radially confined within the quadrupole device 10 and/or to be selected or filtered according to their mass to charge ratio, for example, as they pass through the quadrupole device 10.

Ions that emerge from the quadrupole device 10 may be detected by the detector 90. An orthogonal acceleration time of flight mass analyser may optionally be provided, for example, adjacent the detector 90

Figure 10:
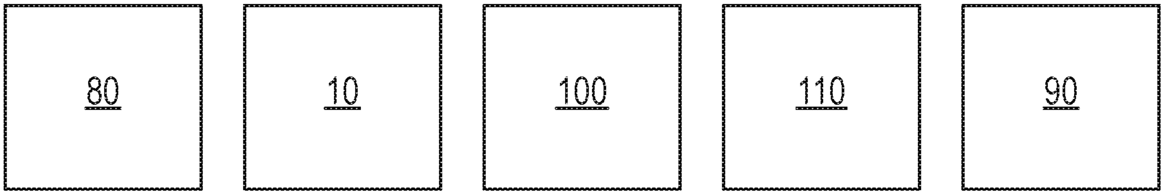

FIG. 10 shows a tandem quadrupole arrangement comprising a collision, fragmentation or reaction device 100 downstream of the quadrupole device 10, and a second quadrupole device 110 downstream of the collision, fragmentation or reaction device 100. In various embodiments, one or both quadrupoles may be operated in the manner described above.

In these embodiments, the ion source 80 may comprise any suitable ion source. For example, the ion source 80 may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The collision, fragmentation or reaction device 100 may comprise any suitable collision, fragmentation or reaction device. For example, the collision, fragmentation or reaction device 100 may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("BD") fragmentation device.

Various other embodiments are possible. For example, one or more other devices or stages may be provided upstream, downstream and/or between any of the ion source 80, the quadrupole device 10, the fragmentation, collision or reaction device 100, the second quadrupole device 110, and the detector 90.

For example, the analytical instrument may comprise a chromatography or other separation device upstream of the ion source 80. The chromatography or other separation device may comprise a liquid chromatography or gas chromatography device. Alternatively, the separation device may comprise: (i) a Capillary Electrophoresis ("CE") separation device; (ii) a Capillary Electrochromatography ("CEO") separation device; (iii) a substantially rigid ceramic-based multilayer microfluidic substrate ("ceramic tile") separation device; or (iv) a supercritical fluid chromatography separation device.

The analytical instrument may further comprise: (i) one or more ion guides; (ii) one or more ion mobility separation devices and/or one or more Field Asymmetric Ion Mobility Spectrometer devices; and/or (iii) one or more ion traps or one or more ion trapping regions.

Although the present invention has been described with reference to preferred embodiments, it will be understood by those skilled in the art that various changes in form and detail may be made without departing from the scope of the invention as set forth in the accompanying claims.

The invention claimed is:

1. A method of operating a quadrupole device, the method comprising:

operating the quadrupole device in a mode of operation in which a repeating voltage waveform comprising a main drive voltage and at least one auxiliary drive voltage is applied to the quadrupole device;

passing ions into the quadrupole device; and varying the intensity of the ions passing into the quadrupole device in synchronisation with the repeating voltage waveform.

2. The method of claim 1, wherein the repeating voltage waveform repeats with a first period Θ, and wherein varying the intensity of the ions passing into the quadrupole device comprises varying the intensity of the ions passing into the quadrupole device substantially periodically with a second period that is approximately equal to nΘ, where n is a positive integer.

3. The method of claim 1, wherein the repeating voltage waveform repeats with a first period Θ, the main drive voltage repeats with a third period T, and wherein the first period Θ is greater than the third period T.

4. The method of claim 1, wherein varying the intensity of the ions passing into the quadrupole device comprises varying the intensity of the ions passing into the quadrupole such that the number of ions per unit phase which initially experience a phase within a first range of phases of the repeating voltage waveform is greater than the number of ions per unit phase which initially experience a phase within a second range of phases of the repeating voltage waveform.

5. The method of claim 4, wherein the first range of phases is selected such that the maximum amplitude of oscillation of ions which initially experience a phase within the first range of phases is less than the maximum amplitude of oscillation of ions which initially experience a phase within the second range of phases.

6. The method of claim 4, wherein the first range of phases is selected such that the transmission of ions which initially experience a phase within the first range of phases is greater than the transmission of ions which initially experience a phase within the second range of phases.

7. The method of claim 4, wherein varying the intensity of the ions comprises varying the intensity of the ions such that a maximum in the intensity of the ions coincides with the first range of phases.

8. The method of claim 4, wherein varying the intensity of the ions passing into the quadrupole device comprises pulsing the ions into the quadrupole device such that substantially all of the ions initially experience a phase within the first range of phases of the repeating voltage waveform.

9. The method of claim 1, wherein varying the intensity of the ions passing into the quadrupole device comprises at least one of:

(i) trapping ions in an ion trap or ion guide upstream of the quadrupole device, and varying the intensity of ions that are released from the ion trap or ion guide;

(ii) releasing ions having a selected mass to charge ratio or within a selected mass to charge ratio range from an ion trap or ion guide arranged upstream of the quadrupole device;

(iii) attenuating at least some ions upstream of the quadrupole device, and varying the degree to which ions are attenuated;

(iv) varying a DC voltage applied to the quadrupole device;

(v) forming packets of ions upstream of the quadrupole device, and passing the packets of ions into the quadrupole device; and (vi) generating packets of ions using a pulsed ion source, and passing the packets of ions into the quadrupole device.

10. The method of claim 1, wherein the quadrupole device comprises a quadrupole mass filter, and the method comprises operating the quadrupole mass filter in the mode of operation such that ions are selected and/or filtered according to their mass to charge ratio.

11. Apparatus comprising:

a quadrupole device;

one or more voltage sources configured to apply a repeating voltage waveform comprising a main drive voltage and at least one auxiliary drive voltage to the quadrupole device; and one or more devices configured to cause the intensity of ions passing into the quadrupole device to vary in synchronisation with the repeating voltage waveform.

12. The apparatus of claim 11, wherein the repeating voltage waveform repeats with a first period Θ, and wherein the one or more devices are configured to cause the intensity of ions passing into the quadrupole device to vary substantially periodically with a second period that is approximately equal to nΘ, where n is a positive integer.

13. The apparatus of claim 11, wherein the repeating voltage waveform repeats with a first period Θ, the main drive voltage repeats with a third period T, and wherein the first period Θ is greater than the third period T.

14. The apparatus of claim 11, wherein the one or more devices are configured to cause the intensity of ions passing into the quadrupole device to vary such that the number of ions per unit phase which initially experience a phase within a first range of phases of the repeating voltage waveform is greater than the number of ions per unit phase which initially experience a phase within a second range of phases of the repeating voltage waveform.

15. The apparatus of claim 14, wherein:

the first range of phases is selected such that the maximum amplitude of oscillation of ions which initially experience a phase within the first range of phases is less than the maximum amplitude of oscillation of ions which initially experience a phase within the second range of phases; and/or the first range of phases is selected such that the transmission of ions which initially experience a phase within the first range of phases is greater than the transmission of ions which initially experience a phase within the second range of phases.

16. The apparatus of claim 14, wherein the one or more devices are configured to cause the intensity of ions passing into the quadrupole device to vary such that a maximum in the intensity of the ions coincides with the first range of phases.

17. The apparatus of claim 14, wherein the one or more devices are configured to cause the intensity of ions passing into the quadrupole device to vary by pulsing the ions into the quadrupole device such that substantially all of the ions initially experience a phase within the first range of phases of the repeating voltage waveform.

18. The apparatus of claim 11, wherein the one or more devices comprise at least one of:

(i) an ion trap, an analytical ion trap, or an ion guide arranged upstream of the quadrupole device;

(ii) one or more ion attenuators arranged upstream of the quadrupole device;

(iii) one or more voltage sources configured to apply a DC voltage to the quadrupole device;

(iv) an ion packetiser configured to form packets of ions arranged upstream of the quadrupole device; and (v) a pulsed ion source arranged upstream of the quadrupole device.

19. The apparatus of claim 11, wherein the quadrupole device comprises a quadrupole mass filter configured to select and/or filter ions according to their mass to charge ratio.

20. Apparatus comprising:

a quadrupole device;

one or more voltage sources configured to apply a repeating voltage waveform comprising a main drive voltage and at least one auxiliary drive voltage to the quadrupole device; and one or more devices configured to cause the intensity of ions passing into the quadrupole device to vary such that the number of ions per unit phase which initially experience a phase within a first range of phases of the repeating voltage waveform is greater than the number of ions per unit phase which initially experience a phase within a second range of phases of the repeating voltage waveform.

* * * * *